US012627891B2

(12) United States Patent
Huang

(10) Patent No.: US 12,627,891 B2
(45) Date of Patent: May 12, 2026

(54) ILLUMINATING DEVICE

(71) Applicant: Qisda Corporation, Taoyuan City (TW)

(72) Inventor: Ching-Tze Huang, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 65 days.

(21) Appl. No.: 18/943,814

(22) Filed: Nov. 11, 2024

(65) Prior Publication Data

US 2025/0168511 A1 May 22, 2025

(30) Foreign Application Priority Data

Nov. 21, 2023 (CN) .......................... 202311554848.4

(51) Int. Cl.
*H04N 23/69* (2023.01)
*G01B 11/25* (2006.01)
*H04N 23/11* (2023.01)
*H04N 23/50* (2023.01)
*H04N 23/55* (2023.01)
*H04N 23/56* (2023.01)

(52) U.S. Cl.
CPC ......... *H04N 23/69* (2023.01); *G01B 11/2513* (2013.01); *H04N 23/11* (2023.01); *H04N 23/55* (2023.01); *H04N 23/56* (2023.01); *H04N 23/555* (2023.01)

(58) Field of Classification Search
CPC .... G01B 11/2513; H04N 23/11; H04N 23/55; H04N 23/555; H04N 23/56; H04N 23/69
See application file for complete search history.

(56) References Cited

U.S. PATENT DOCUMENTS

| | | | |
|---|---|---|---|
| 2011/0074989 A1* | 3/2011 | Fossum ............... | H10F 39/1825 257/292 |
| 2017/0064231 A1* | 3/2017 | Blanquart .......... | A61B 1/00057 |
| 2019/0052863 A1* | 2/2019 | Yang ................... | G01B 11/2509 |
| 2021/0063601 A1* | 3/2021 | DiFoggio .............. | G06V 20/52 |
| 2021/0203866 A1* | 7/2021 | Koga ..................... | H04N 25/70 |

FOREIGN PATENT DOCUMENTS

CN 107677371 11/2019

* cited by examiner

*Primary Examiner* — Amy R Hsu
(74) *Attorney, Agent, or Firm* — JCIPRNET

(57) ABSTRACT

An illuminating device includes a projection device and an imaging device recording a first image and a second image. The projection device includes a light-emitting device generating a first light beam and a second light beam different from the first light beam to illuminate an object to be measured and a light gate device located in optical paths of the first and light beams and including a first light gate and a second light gate respectively located on a light incident surface and a light exit surface of the light gate device. The first and second light beams pass through the light gate device and respectively produces the first image in a first depth of field range and the second image in a second depth of field range different from the first depth of field range. The first and second image are projected on the object to be measured.

20 Claims, 11 Drawing Sheets

124C

124C2

124C1

122C

122C2

122C1

Y

X

ILLUMINATING DEVICE

CROSS-REFERENCE TO RELATED APPLICATION

This application claims the priority benefit of China application serial no. 202311554848.4, filed on Nov. 21, 2023. The entirety of the above-mentioned patent application is hereby incorporated by reference herein and made a part of specification.

BACKGROUND

Technical Field

The disclosure relates to an illuminating device.

Description of Related Art

A basic principle of a mouth scanner system is to generate structured light to illuminate a target object, and collect image light reflected by the target object (such as teeth) to establish a 3D surface model of the target object. A good mouth scanner may provide a large depth of field (DOF). When scanning an oral cavity, the mouth scanner with a larger DOF may provide excellent images of roots of teeth or molar deep parts that are difficult to be approached by a front end of the mouth scanner, so as to maintain accuracy of the entire mouth.

In order to improve the DOF of the mouth scanner, commonly used techniques include changing a size of a lens aperture in the mouth scanner system. Since the deeper the DOF is, the smaller the lens aperture is, in order to increase the DOF, it is required to reduce the aperture size. However, this method sacrifices an overall light intensity, resulting in a decrease in resolution. Therefore, how to maintain system brightness and increase DOF has always been an important issue in the field of mouth scanners.

SUMMARY

The disclosure is directed to an illuminating device for simultaneously generating images with different depths of field.

The disclosure provides an illuminating device including a projection device and an imaging device. The projection device includes a light-emitting device and a light gate device. The light-emitting device is configured to generate a first light beam to illuminate an object to be measured and generate a second light beam that is different from the first light beam to illuminate the object to be measured. The light gate device is located in optical paths of the first light beam and the second light beam. The light gate device includes a first light gate located on a light incident surface of the light gate device and a second light gate located on a light exit surface of the light gate device. The first light beam passes through the light gate device and produces a first image in a first depth of field range, and the second light beam passes through the light gate device and produces a second image in a second depth of field range that is different from the first depth of field range. The first image and the second image are projected on the object to be measured. The imaging device is configured to record the first image and the second image.

According to some embodiments, the first light beam has a first wavelength and the second light beam has a second wavelength that is different from the first wavelength.

According to some embodiments, the first light beam has a first polarization direction, and the second light beam has a second polarization direction that is substantially perpendicular to the first polarization direction.

According to some embodiments, the light incident surface and the light exit surface of the light gate device are parallel to each other.

According to some embodiments, a part of the first light beam passes through the first light gate, and the part of the first light beam completely passes through the second light gate.

According to some embodiments, the second light beam completely passes through the first light gate, and the second light beam partially passes through the second light gate.

According to some embodiments, the first light gate includes a first pattern and a second pattern. When the first light beam illuminates the first light gate, the first light beam penetrates through the first pattern, and the first light beam does not penetrate through the second pattern. When the second light beam illuminates the first light gate, the second light beam penetrates through the first pattern and the second pattern.

According to some embodiments, the first light gate includes a first pattern and a second pattern. When the first light beam illuminates the first light gate, the first light beam penetrates through the first pattern, and the first light beam does not penetrate through the second pattern. When the second light beam illuminates the first light gate, the second light beam does not penetrate through the first pattern, and the second light beam penetrates through the second pattern.

According to some embodiments, the second light gate includes a third pattern and a fourth pattern. When the first light beam illuminates the second light gate, the first light beam penetrates through the third pattern and the fourth pattern. When the second light beam illuminates the second light gate, the second light beam does not penetrate through the third pattern, and the second light beam penetrates through the fourth pattern.

According to some embodiments, the second light gate includes a third pattern and a fourth pattern. When the first light beam illuminates the second light gate, the first light beam penetrates through the third pattern, and the first light beam does not penetrate through the fourth pattern. When the second light beam illuminates the second light gate, the second light beam does not penetrate through the third pattern, and the second light beam penetrates through the fourth pattern.

According to some embodiments, the first light gate and the second light gate have different patterns.

According to some embodiments, the first light gate and the second light gate have a same pattern.

According to some embodiments, the first light beam is one of infrared light, red light, green light, blue light, near-ultraviolet light, and ultraviolet light, and the second light beam is one of infrared light, red light, green light, blue light, near-ultraviolet light, and ultraviolet light.

According to some embodiments, the imaging device includes a first image sensor and a second image sensor. The first image sensor is configured to sense the first image, and the second image sensor is configured to sense the second image.

According to some embodiments, the first image sensor and the second image sensor simultaneously sense the first image and the second image.

According to some embodiments, the first image sensor senses the first image in a first time period, and the second image sensor senses the second image in a second time period different from the first time period.

According to some embodiments, the imaging device includes an image sensor, and the image sensor senses the first image in a first time period and senses a second image in a second time period that is different from the first time period.

According to some embodiments, the imaging device includes a lens, the lens is a movable lens, and the movable lens moves back and forth along the optical paths to change projection positions of the first image and the second image on the imaging device.

According to some embodiments, the imaging device includes a lens, and the lens includes a zoom lens for changing projection positions of the first image and the second image on the imaging device.

According to some embodiments, the imaging device includes a lens, and the lens includes a movable lens that moves in the lens along the optical paths to change a focal length of the lens.

Based on the above descriptions, by producing two light beams with different optical properties and two light gates at different positions, images with two different depths of field may be produced simultaneously. Therefore, the depth of field of the system is increased while brightness is maintained without reducing an aperture inside the projection lens.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
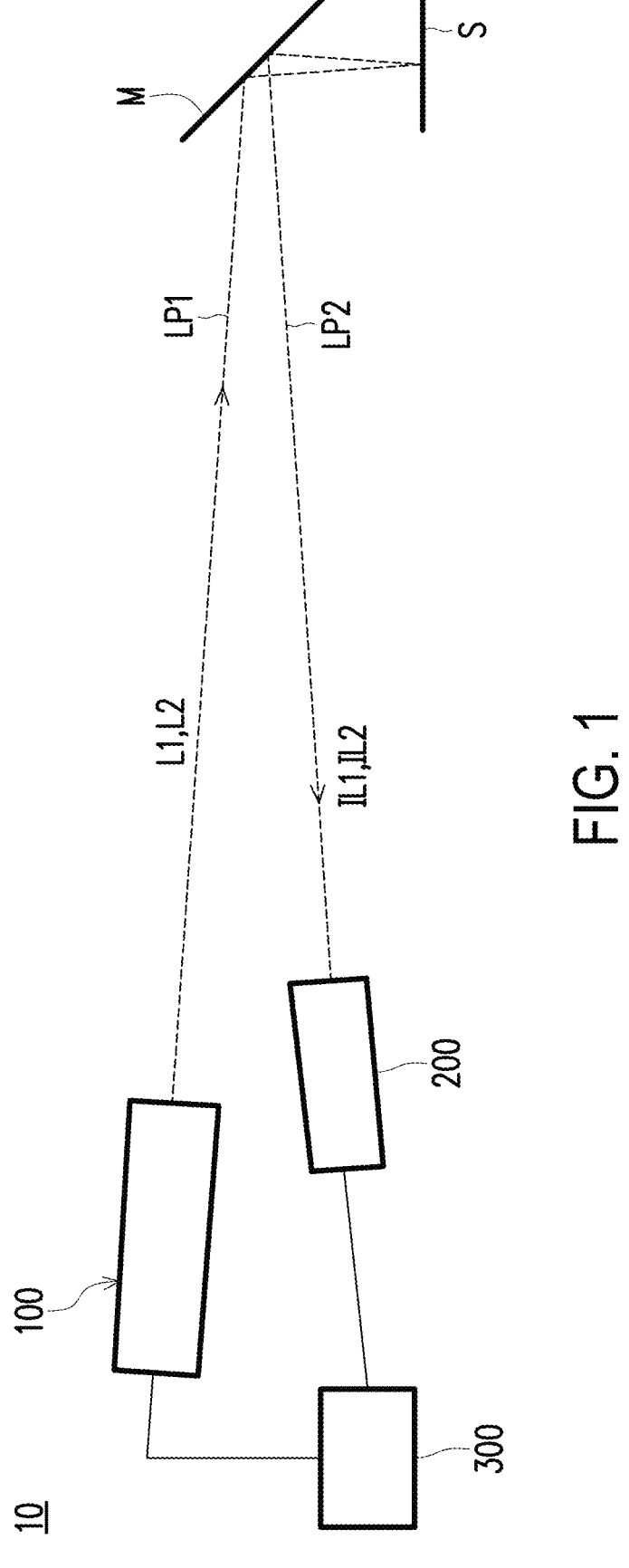
FIG. 1 is a schematic diagram of an illuminating device according to an embodiment of the disclosure.

FIG. 1 is a schematic diagram of an illuminating device according to an embodiment of the disclosure. An illuminating device 10 includes a projection device 100, an imaging device 200, and a processor 300.

The projection device 100 is configured to generate a first light beam L1, and generates a first image within a first depth of field range to illuminate an object S to be measured. The projection device 100 further generates a second light beam L2 that is different from the first light beam L1, and generates a second image within a second depth of field range that is different from the first depth of field range. The first image and the second image are projected to the object S to be measured. The specific structure of the projection device 100 is to be described below.

The first light beam L1 and the second light beam L2 emitted by the projection device 100 are incident to a reflector M through a projection path LP1, and are reflected by the reflector M, and then projected to the object S to be measured. In some embodiments, the reflector M may be a reflecting mirror, or an optical element with a metal reflective coating, or other elements with similar functions, which is not limited by the disclosure. In some embodiments, the object S to be measured is teeth.

When the first light beam L1 and the second light beam L2 are projected to the object S to be measured, the first image and the second image formed by the first light beam L1 and the second light beam L2 are reflected by the object S to be measured to form a first image beam IL1 and a second image beam IL2. The first image beam IL1 and the second image beam IL2 are incident to the reflector M and are reflected by the reflector M, and then enter the imaging device 200 along a sensing path LP2.

The imaging device 200 is configured to record the first image and the second image. Specifically, the imaging device 200 receives the first image beam IL1 and the second image beam IL2, and the processor 300 processes the same to generate the first image and the second image. The specific structure of the imaging device 200 is to be described below.

The processor 300 is coupled to the imaging device 200 for analyzing the first image and the second image of the object S to be measured, where the first image corresponds to the first image beam IL1 of the object S to be measured, and the second image corresponds to the second image beam IL2 of the object S to be measured. In some embodiments, the processor 300 may include a calculator, a micro controller unit (MCU), a central processing unit (CPU), or other programmable controller (microprocessor), digital signal processor (DSP), programmable controller, application specific integrated circuits (ASIC), programmable logic device (PLD) or other similar devices.

Figure 2:
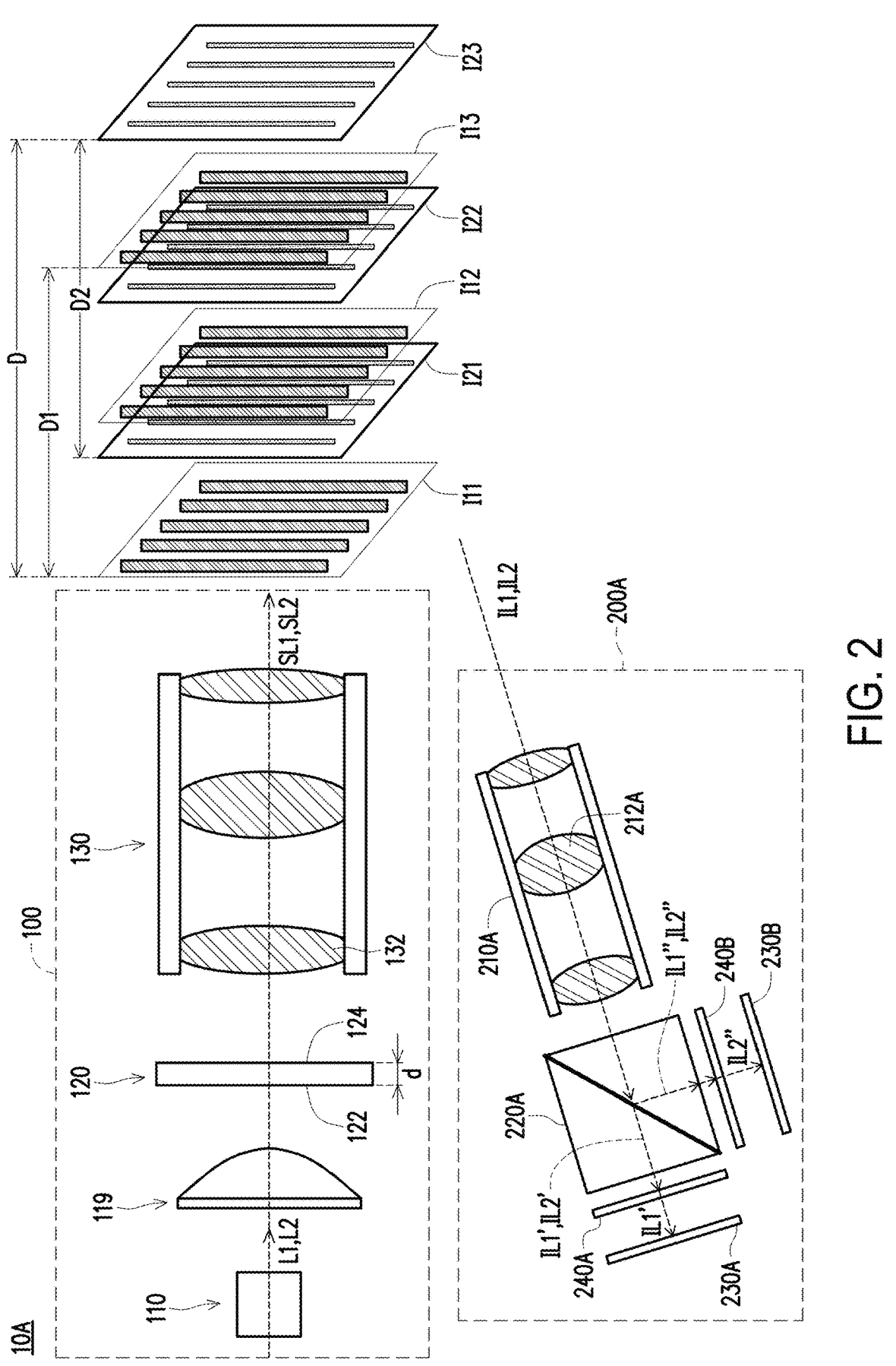
FIG. 2 is a schematic diagram of an illuminating device according to an embodiment of the disclosure.

FIG. 2 is a schematic diagram of an illuminating device according to an embodiment of the disclosure. To simplify the drawing, some components in FIG. 1 are not shown in FIG. 2. Referring to FIG. 2, an illuminating device 10A is an embodiment of the illuminating device 10 in FIG. 1. The illuminating device 10A includes a projection device 100 and an imaging device 200A.

The projection device 100 includes a light-emitting device 110, a light gate device 120 and a projection lens group 130.

The light-emitting device 110 is configured to generate a first light beam L1 to illuminate the object S to be measured, and generate a second light beam L2 different from the first light beam L1 to illuminate the object S to be measured. Some embodiments of the light-emitting device 110 are described below with reference to FIG. 3 and FIG. 4.

Figure 3:
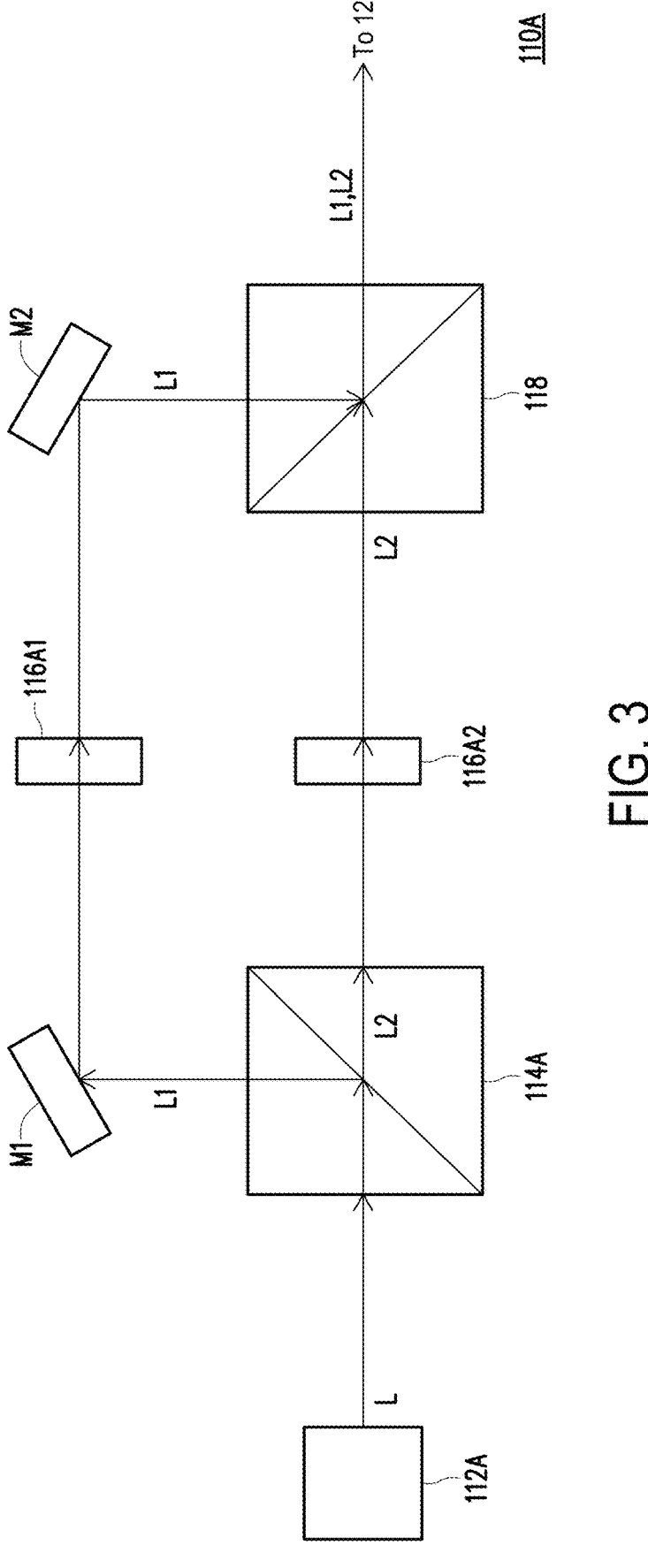
FIG. 3 is a schematic diagram of a light-emitting device according to an embodiment of the disclosure.

FIG. 3 is a schematic diagram of a light-emitting device according to an embodiment of the disclosure. A light-emitting device 110A shown in FIG. 3 is an embodiment of the light-emitting device 110 in FIG. 2. As shown in FIG. 3, the light-emitting device 110 includes a light source 112A for generating a light beam L. In some embodiments, the light source 112A may be a light-emitting diode (LED), a mini LED, a micro (LED), an organic LED, a laser diode, or other suitable devices, which is not limited by the disclosure. In some embodiments, the light beam L may be a single color light with a plurality of polarization directions. For example, the light beam L may be one of infrared light, red light, green light, blue light, near-ultraviolet light, or ultraviolet light with two mutually perpendicular polarization directions, but the disclosure is not limited thereto. The light beam L may also be a light beam formed by mixing two different colors of light. For example, the light beam L may include any two light beams of infrared light, red light, green light, blue light, near-ultraviolet light, or ultraviolet light, but the disclosure is not limited thereto.

After the light beam L is emitted by the light source 112A, it enters a light-splitting element 114A. The light-splitting element 114A splits the light beam L into the first light beam L1 and the second light beam L2.

The first light beam L1 is reflected by the light-splitting element 114A, and is incident to a light filter 116A1 after being reflected by the reflector M1. In some embodiments, the light filter 116A1 may allow the first light beam L1 having a specific optical characteristic to pass through. The first light beam L1 passing through the light filter 116A1 is reflected by a reflector M2 and is then incident to a light-combining element 118. In some embodiments, the first light beam L1 may also be incident to the light filter 116A1 and the light-combining element 118 in different ways, and one or all of the reflector M1 and the reflector M2 may be omitted, or other optical elements capable of changing the optical paths may be added, which is not limited by the disclosure.

After the second light beam L2 passes through the light-splitting element 114A, it is incident to a light filter 116A2. In some embodiments, the light filter 116A2 may allow the second light beam L2 having a specific optical characteristic to pass through. The second light beam L2 passing through the light filter 116A2 is reflected by the reflector M2 and is then incident to the light-combining element 118.

After the first light beam L1 is reflected by the light-combining element 118, it has a same optical path as the second light beam L2 transmitted through the light-combining element 118. The first light beam L1 and the second light beam L2 are incident to the light gate device 120 as shown in FIG. 2 along the common optical path.

In some embodiments, the light beam L may be single color light having a plurality of polarization directions perpendicular to the optical path direction. In some embodiments, the light beam L may be one of infrared light, red light, green light, blue light, near-ultraviolet light, or ultraviolet light, but the disclosure is not limited thereto. In this case, the light filter 116A1 and the light filter 116A2 may be polarizers, so that the first light beam L1 passing through the light filter 116A1 has a first polarization direction, and the second light beam L2 passing through the light filter 116A2 has a second polarization direction substantially perpendicular to the first polarization direction. In some embodiments, an included angle between the first polarization direction and the second polarization direction ranges from 80 degrees to 100 degrees, preferably from 85 degrees to 95 degrees, but the disclosure is not limited thereto.

In some embodiments, the light beam L may be a light beam formed by two light beams with different polarization directions. For example, in some embodiments, the light beam L may be formed by a light beam having a vertical polarization direction and a light beam having a horizontal polarization direction. In this case, the light filter 116A1 may be a light filter that allows light beams with the vertical polarization direction to pass through, so that the first light beam L1 forms a light beam with the vertical polarization direction. The light filter 116A2 may be a light filter that allows light beams with the horizontal polarization direction to pass through, so that the second light beam L2 forms a light beam with the horizontal polarization direction. Therefore, the first light beam L1 passing through the light filter 116A2 has a first polarization direction, such as the vertical polarization direction, and the second light beam L2 passing through the light filter 116A2 has a second polarization direction different from the first polarization direction, such as the horizontal polarization direction.

In some embodiments, the light beam L may be a light beam formed by two different colors of light. For example, in some embodiments, the light beam L may be formed by blue light and red light. In this case, the light filter 116A1 may be a red light filter that allows the blue light to pass through and blocks the red light, so that the first light beam L1 forms the blue light. The light filter 116A2 may be a blue light filter that allows the red light to pass through and blocks the blue light, so that the second light beam L2 forms the red light. In other embodiments, the light beam L may be formed by blue light and green light. In this case, the light filter 116A1 may be a green light filter that allows the blue light to pass through and blocks the green light, so that the first light beam L1 forms the blue light. The light filter 116A2 may be a blue light filter that allows the green light to pass through and blocks the blue light, so that the second light beam L2 forms the green light. Therefore, the first light beam L1 passing through the light filter 116A2 has a first wavelength, and the second light beam L2 passing through the light filter 116A2 has a second wavelength that is different from the first wavelength.

Figure 4:
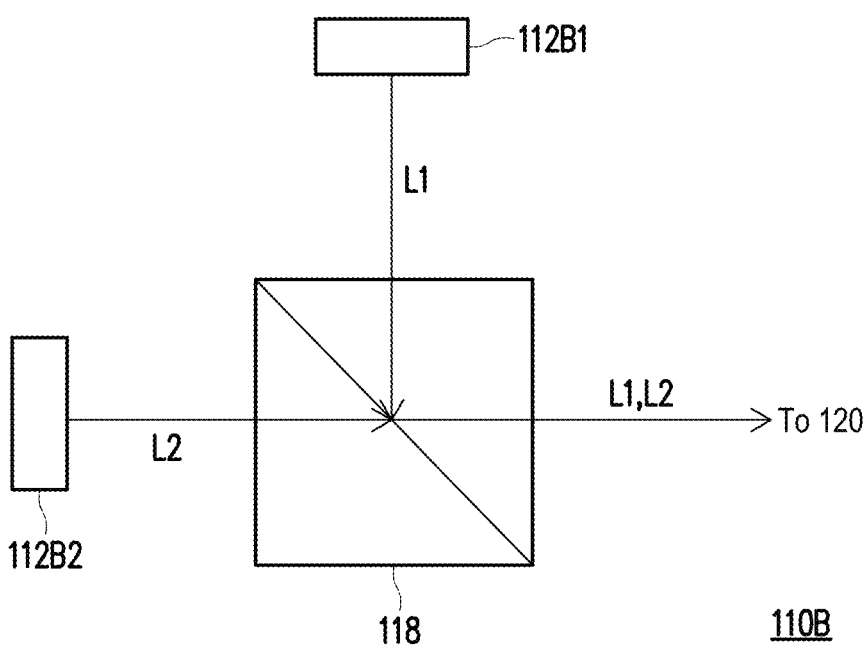
FIG. 4 is a schematic diagram of a light-emitting device according to an embodiment of the disclosure.

FIG. 4 is a schematic diagram of a light-emitting device according to an embodiment of the disclosure. A light-emitting device 110B shown in FIG. 4 is an embodiment of the light-emitting device 110 in FIG. 2. As shown in FIG. 4, the light-emitting device 110B includes a light source 112B1 and a light source 112B2. The light source 112B1 is configured to generate the first light beam L1, and the light source 112B2 is configured to generate the second light beam L2. In some embodiments, the light source 112B1 and the light source 112B2 may be light-emitting diodes, mini LEDs, micro LEDs, organic LEDs, laser diodes, or other suitable light-emitting elements, which are not limited by the disclosure.

In some embodiments, the first light beam L1 has a first polarization direction, and the second light beam L2 has a second polarization direction that is substantially perpendicular to the first polarization direction. For example, the first polarization direction may be the vertical polarization direction, and the second polarization direction may be the horizontal polarization direction, but the disclosure is not limited thereto.

In some embodiments, the first light beam L1 has a first wavelength, and the second light beam L2 has a second wavelength different from the first wavelength. For example, the first light beam L1 may be one of infrared light, red light, green light, blue light, near-ultraviolet light, or ultraviolet light, the second light beam L2 may be another one of infrared light, red light, green light, blue light, near-ultraviolet light, or ultraviolet light that is different from the first light beam L1. For example, the first light beam L1 may be blue light, and the second light beam L2 may be red light or green light, but the disclosure is not limited thereto.

After the first light source 112B1 emits the first light beam L1, the first light beam L1 is incident to the light-combining element 118. After the second light source 112B2 emits the second light beam L2, the second light beam L2 is incident to the light-combining element 118.

After the first light beam L1 is reflected by the light-combining element 118, it has the same optical path as the second light beam L2 transmitted through the light-combining element 118. The first light beam L1 and the second light beam L2 are incident to the light gate device 120 as shown in FIG. 2 along the common optical path.

In the embodiment, the first light source 112B1 and the second light source 112B2 are located outside the light-combining element 118. In another embodiment, the first light source 112B1 and the second light source 112B2 may be combined with the light-combining element 118 to reduce energy loss of the first light beam L1 and the second light beam L2 incident to the light-combining element 118, and shorten the optical path.

Figure 5:
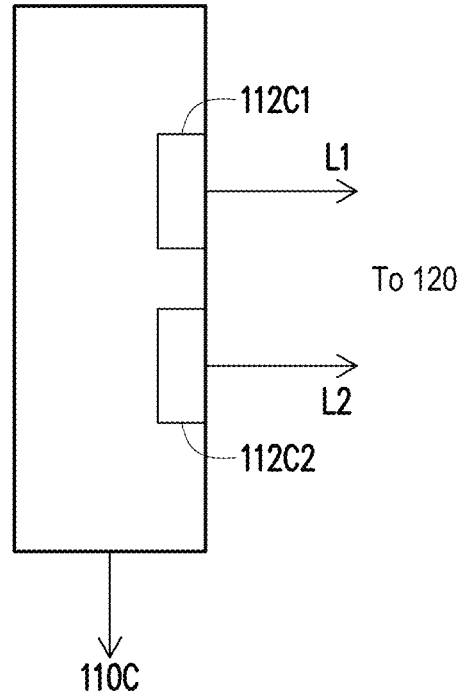
FIG. 5 is a schematic diagram of a light-emitting device according to an embodiment of the disclosure.

FIG. 5 is a schematic diagram of a light-emitting device according to an embodiment of the disclosure. A light-emitting device 110C shown in FIG. 5 is an embodiment of the light-emitting device 110 in FIG. 2. As shown in FIG. 5, the light-emitting device 110C includes a light source 112C1 and a light source 112C2. The light source 112C1 is configured to generate the first light beam L1, and the light source 112C2 is configured to generate the second light beam L2. In some embodiments, the light source 112C1 and the light source 112C2 may be light-emitting diodes, mini LEDs, micro LEDs, organic LEDs, laser diodes, or other suitable light-emitting elements, but the disclosure is not limited thereto.

In the embodiment, the light source 112C1 and the light source 112C2 are located on the same side, so that the emitted first light beam L1 and the second light beam L2 have the same optical path. Therefore, in the light-emitting device 110C, it is not necessary to combine the first light beam L1 with the second light beam L2 through the light-combining element 118 as shown in the light-emitting device 110B in FIG. 3 to achieve the effect of reducing a system volume.

Referring to FIG. 2 again, after the light-emitting device 110 emits the first light beam L1 and the second light beam L2, the first light beam L1 and the second light beam L2 are incident to the light gate device 120 after passing through a lens 119.

The light gate device 120 is located on the optical paths of the first light beam L1 and the second light beam L2. In some embodiments, the light gate device 120 is a transparent optical element for letting the first light beam L1 and the second light beam L2 to pass through and patterning the first light beam L1 and the second light beam L2 respectively. In some embodiments, the light gate device 120 may be made of glass or other materials with similar properties, but the disclosure is not limited thereto. As shown in FIG. 2, the light gate device 120 has a thickness d. The thickness d of the light gate device 120 may cause the first light beam L1 and the second light beam L2 to produce different depths of field, so that the thickness d needs to be within a certain range. If the thickness d is excessively small, a difference of the depths of field between the images generated by the first light beam L1 and the second light beam L may not be obvious. Or, if the thickness d is excessively large, the first light beam L1 and the second light beam L may lose energy in the light gate device 120, resulting in a decrease in resolution. In some embodiments, the thickness d of the light gate device 120 is 0.5 mm-2 mm, but the disclosure is not limited thereto.

As shown in FIG. 2, the light gate device 120 includes a first light gate 122 and a second light gate 124. The first light gate 122 is located on a light incident surface of the light gate device 120. The second light gate 124 is located on a light exit surface of the light gate device 120. In some embodiments, the light incident surface and the light exit surface of the light gate device 120 are parallel to each other. Therefore, the first light gate 122 located on the light incident surface of the light gate device 120 and the second light gate 124 located on the light exit surface of the light gate device 120 are also parallel to each other. In addition, the light incident surface and the light exit surface of the light gate device 120 are both perpendicular to the optical paths of the first light beam L1 and the second light beam L2. Therefore, the first light gate 122 located on the light incident surface of the light gate device 120 and the second light gate 124 located on the light exit surface of the light gate device 120 are also perpendicular to the optical paths of the first light beam L1 and the second light beam L2.

After the first light beam L1 and the second light beam L2 pass through the light gate device 120, the first light beam L1 and the second light beam L2 may be patterned by the light gate device 120. A patterning process of the first light beam L1 and the second light beam L2 is described below.

Figure 6B:
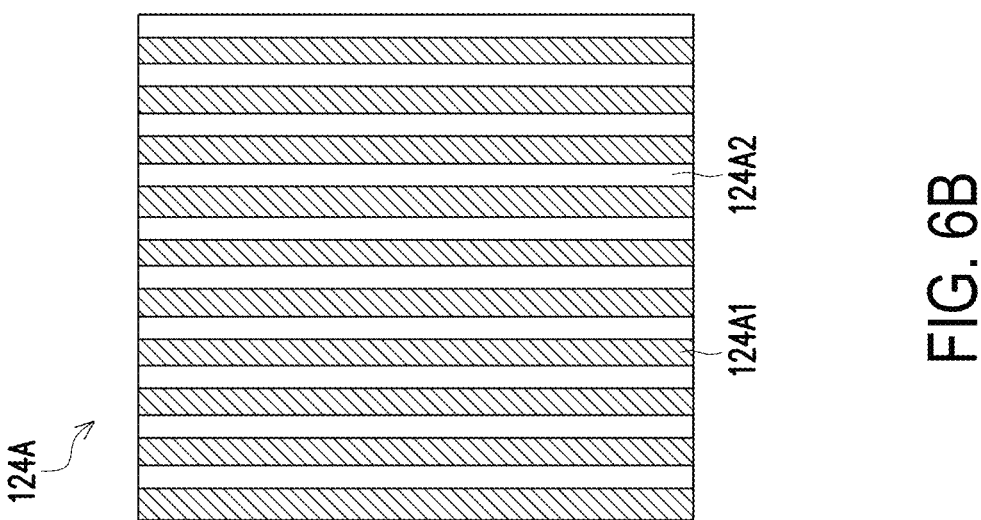
FIG. 6A and FIG. 6B respectively are schematic diagrams of a first light gate and a second light gate according to an embodiment of the disclosure.
Figure 6A:
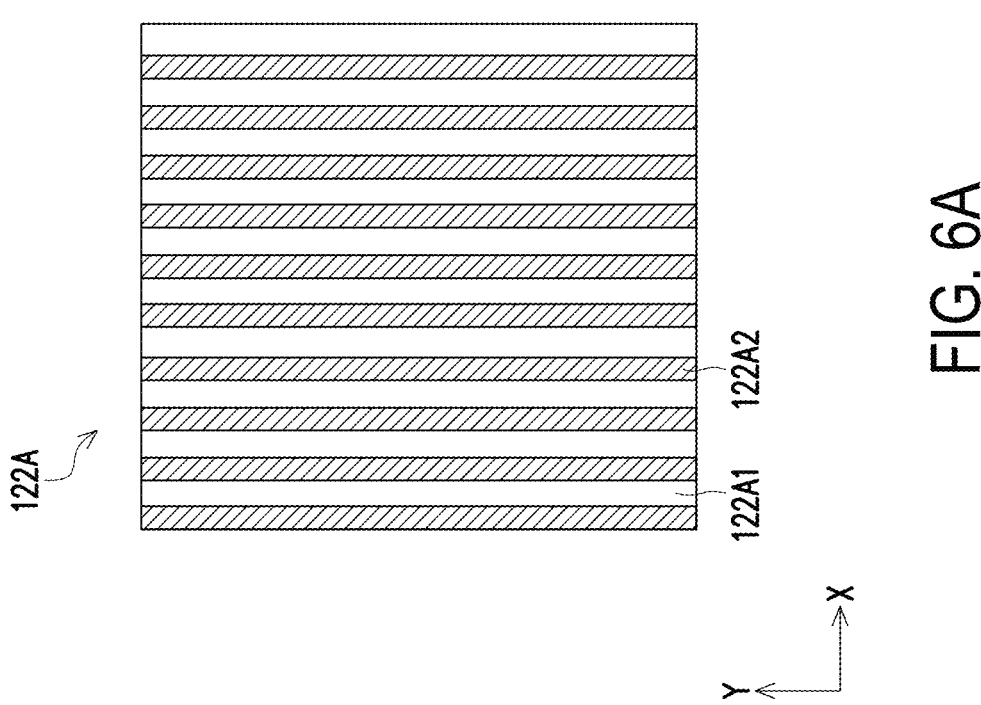

FIG. 6A and FIG. 6B respectively are schematic diagrams of a first light gate and a second light gate according to an embodiment of the disclosure. A first light gate 122A is an embodiment of the first light gate 122 in FIG. 2. A second light gate 124A is an embodiment of the second light gate 124 in FIG. 2.

Referring to FIG. 2, FIG. 6A and FIG. 6B together, when the first light beam L1 and the second light beam L2 are incident to the light gate device 120, the first light beam L1 sequentially passes through the first light gate 122A and the second light gate 124A, and the second light beam L2 sequentially passes through the first light gate 122A and the second light gate 124A.

A part of the first light beam L1 passes through the first light gate 122, and the part of the first light beam L1 (i.e., the part that passes through the first light gate 122) completely passes through the second light gate 124. The second light beam L2 completely passes through the first light gate 122, and a part of the second light beam L2 passes through the second light gate 124.

Specifically, when the first light beam L1 passes through the first light gate 122A, the first light gate 122A patterns the first light beam L1, i.e., a part of the first light beam L1 passes through the first light gate 122A, and a part of the first light beam L1 is blocked by the first light gate 122A. When the first light beam L1 passing through the first light gate 122A is incident to the second light gate 124A, the second light gate 124A is transparent relative to the first light beam L1, so that the first light beam L1 may completely pass through the second light gate 124A, and the patterning of the first light beam L1 by the first light gate 122A is retained.

On the other hand, when the second light beam L2 is incident to the first light gate 122A, the first light gate 122A is transparent relative to the second light beam L2, so that the second light beam L2 may completely pass through the first light gate 122A. When the second light beam L2 continues to be incident to the second light gate 124A, the second light gate 124A patterns the second light beam L2, i.e., a part of the second light beam L2 passes through the second light gate 124A, and a part of the second light beam L2 is blocked by the second light gate 124A.

Specifically, as shown in FIG. 6A, the first light gate 122A includes a first pattern 122A1 and a second pattern 122A2. The first pattern 122A1 includes a plurality of rectangles, and the second pattern 122A2 includes a plurality of rectangles. The plurality of rectangles of the first pattern 122A1 and the plurality of rectangles of the second pattern 122A2 are arranged in an alternating manner. In some embodiments, the rectangle of the first pattern 122A1 has a same size as the rectangle of the second pattern 122A2. In some embodiments, the rectangle of the first pattern 122A1 and the rectangle of the second pattern 122A2 are different in size.

In the embodiment, the first pattern 122A1 is made of a material that allows the first light beam L1 and the second light beam L2 to pass through. The second pattern 122A2 is made of a material that may block the first light beam L1 and allow the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The first pattern 122A1 may not have any material, and the second pattern 122A2 may be a material that allows light beams with the horizontal polarization direction to pass through and blocks light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The first pattern 122A1 may not have any material, and the second pattern 122A2 may be a material that allows the second light beam with the second wavelength to pass through and blocks the first light beam with the first wavelength, such as a blue light filter.

In some embodiments, the second pattern 122A2 may absorb the first light beam L1 or reflect the first light beam L1. Therefore, when the first light beam L1 illuminates the first light gate 122A, the first light beam L1 penetrates through the first pattern 122A1, but the first light beam L1 does not penetrate through the second pattern 122A2. When the second light beam L2 illuminates the first light gate 122A, the second light beam L2 penetrates through the first pattern 122A1 and the second pattern 122A2.

As shown in FIG. 6B, the second light gate 124A includes a third pattern 124A1 and a fourth pattern 124A2. The third pattern 124A1 includes a plurality of rectangles, and the fourth pattern 124A2 includes a plurality of rectangles. The plurality of rectangles of the third pattern 124A1 and the plurality of rectangles of the fourth pattern 124A2 are arranged in an alternating manner. In some embodiments, the rectangle of the third pattern 124A1 has the same size as the rectangle of the fourth pattern 124A2. In some embodiments, the rectangle of the third pattern 124A1 and the rectangle of the fourth pattern 124A2 are different in size.

In the embodiment, the third pattern 124A1 is made of a material that allows the first light beam L1 to pass through and blocks the second light beam L2. The fourth pattern 124A2 is made of a material that allows the first light beam L1 and the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The third pattern 124A1 may be a material that allows light beams with the vertical polarization direction to pass through and block light beams with the horizontal polarization direction, while the fourth pattern 124A2 may not have any material. In some embodiments, the first light beam L1 has a first wavelength, and the second light beam L2 has a second wavelength that is different from the first wavelength. For example, the first light beam L1 is blue light, and the second light beam L2 is red light or green light. The third pattern 124A1 may be a material that allows the first light beam with the first wavelength to pass through and block the second light beam with the second wavelength, such as a red light filter or a green light filter. The fourth pattern 124A2 may not have any material.

In some embodiments, the third pattern 124A1 may absorb the second light beam L2 or reflect the second light beam L2. Therefore, when the first light beam L1 illuminates the second light gate 124A, the first light beam L1 penetrates through the third pattern 124A1 and the fourth pattern 124A2. When the second light beam L2 illuminates the first light gate 122A, the second light beam L2 does not penetrate through the third pattern 124A1, but the second light beam L2 penetrates through the fourth pattern 124A2.

Therefore, when the first light beam L1 and the second light beam L2 are incident to the light gate device 120A, the first light beam L1 may be patterned by the first light gate 122A, and the second light beam L2 may be patterned by the second light gate 124A. Specifically, the first light beam L1 may be patterned by the first pattern 122A1 of the first light gate 122A, and the second light beam L2 may be patterned by the fourth pattern 124A2 of the second light gate 124A. The first light beam L1 is patterned by one light gate, and the second light beam L2 is patterned by one light gate.

In some embodiments, the first light gate 122A and the second light gate 124A have different patterns. For example, the first pattern 122A1 of the first light gate 122A and the third pattern 124A1 of the second light gate 124A have different patterns, and the second pattern 122A2 of the first light gate 122A and the fourth pattern 124A2 of the second light gate 124A have different patterns.

In some embodiments, the first light gate 122A and the second light gate 124A have the same pattern. For example, the first pattern 122A1 of the first light gate 122A and the third pattern 124A1 of the second light gate 124A have the same pattern, and the second pattern 122A2 of the first light gate 122A and the fourth pattern 124A2 of the second light gate 124A have the same pattern.

Figure 7B:
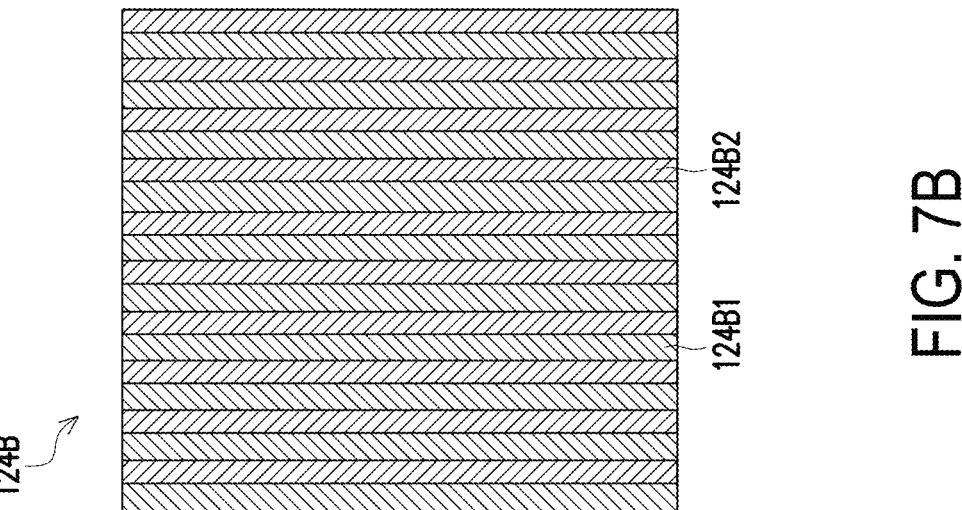
FIG. 7A and FIG. 7B respectively are schematic diagrams of a first light gate and a second light gate according to an embodiment of the disclosure.
Figure 7A:
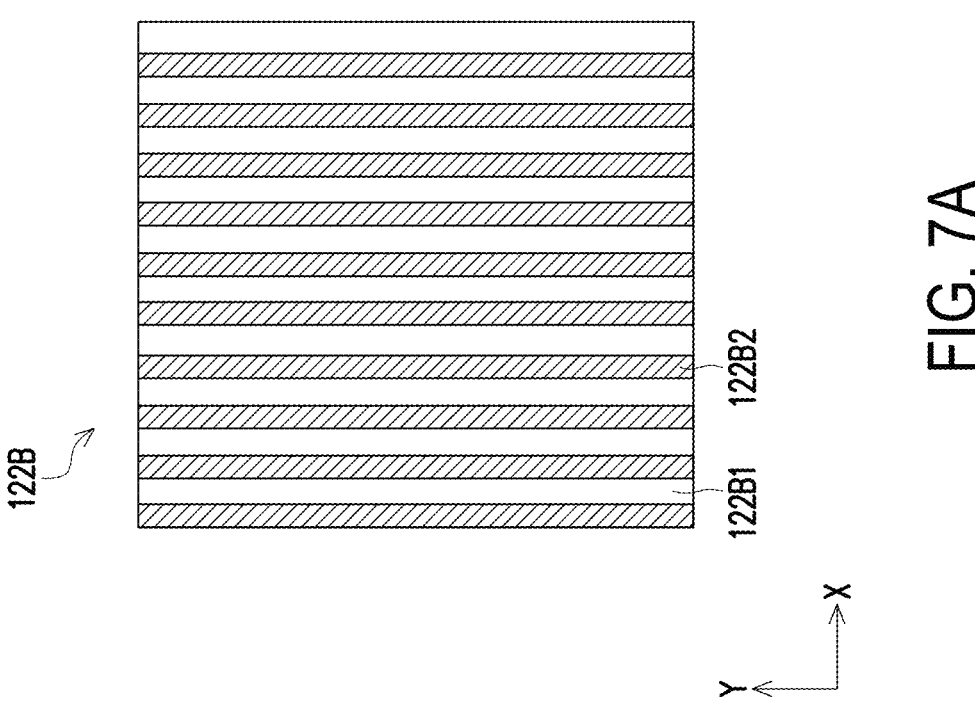

FIG. 7A and FIG. 7B respectively are schematic diagrams of another first light gate and another second light gate according to an embodiment of the disclosure. A first light gate 122B is an embodiment of the first light gate 122 in FIG. 2. A second light gate 124B is an embodiment of the second light gate 124 in FIG. 2.

Referring to FIG. 2, FIG. 7A and FIG. 7B together, when the first light beam L1 and the second light beam L2 are incident to the light gate device 120, the first light beam L1 sequentially passes through the first light gate 122B and the second light gate 124B, and the second light beam L2 sequentially passes through the first light gate 122B and the second light gate 124B.

A Part of the first light beam L1 passes through the first light gate 122B, and the part of the first light beam L1 (i.e., the part that passes through the first light gate 122) partially passes through the second light gate 124B. The second light beam L2 completely passes through the first light gate 122B, and a part of the second light beam L2 passes through the second light gate 124B. In other words, compared to FIG. 6A and FIG. 6B, in FIG. 7B, the first light beam L1 only partially passes through the second light gate 124B.

Specifically, when the first light beam L1 passes through the first light gate 122B, the first light gate 122B patterns the first light beam L1, i.e., a part of the first light beam L1 passes through the first light gate 122B, and a part of the first light beam L1 is blocked by the first light gate 122B. When the first light beam L1 passing through the first light gate 122B is incident to the second light gate 124B, a part of the first light beam L1 passing through the first light gate 122B is blocked by the second light gate 124B, so that the first light beam L1 is patterned again in the second light gate 124B.

On the other hand, the second light beam L2 is patterned only in the second light gate 124B.

Specifically, as shown in FIG. 7A, the first light gate 122B includes a first pattern 122B1 and a second pattern 122B2. The first pattern 122B1 includes a plurality of rectangles, and the second pattern 122B2 includes a plurality of rectangles. The plurality of rectangles of the first pattern 122B1 and the plurality of rectangles of the second pattern 122B2 are arranged in an alternating manner. In some embodiments, the rectangle of the first pattern 122B1 has the same size as the rectangle of the second pattern 122B2. In some embodiments, the rectangle of the first pattern 122B1 and the rectangle of the second pattern 122B2 are different in size.

In the embodiment, the first pattern 122B1 is made of a material that allows the first light beam L1 and the second light beam L2 to pass through. The second pattern 122B2 is made of a material that may block the first light beam L1 and allow the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The first pattern 122B1 may not have any material, and the second pattern 122B2 may be a material that allows light beams with the horizontal polarization direction to pass through and blocks light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The first pattern 122B1 may not have any material, and the second pattern 122B2 may be a material that allows the second light beam with the second wavelength to pass through and blocks the first light beam with the first wavelength, such as a blue light filter.

In some embodiments, the second pattern 122B2 may absorb the first light beam L1 or reflect the first light beam L1. Therefore, when the first light beam L1 illuminates the first light gate 122B, the first light beam L1 penetrates through the first pattern 122B1, but the first light beam L1 does not penetrate through the second pattern 122B2. When the second light beam L2 irradiates the first light gate 122B, the second light beam L2 penetrates through the first pattern 122B1 and the second pattern 122B2.

As shown in FIG. 7B, the second light gate 124B includes a third pattern 124B1 and a fourth pattern 124B2. The third pattern 124B1 includes a plurality of rectangles, and the fourth pattern 124B2 includes a plurality of rectangles. The plurality of rectangles of the third pattern 124B1 and the plurality of rectangles of the fourth pattern 124B2 are arranged in an alternating manner. In some embodiments, the rectangle of the third pattern 124B1 has the same size as the rectangle of the fourth pattern 124B2. In some embodiments, the rectangle of the third pattern 124B1 and the rectangle of the fourth pattern 124B2 are different in size.

In the embodiment, the third pattern 124B1 is made of a material that allows the first light beam L1 to pass through and blocks the second light beam L2. The fourth pattern 124B2 is made of a material that blocks the first light beam L1 and allows the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The third pattern 124B1 may be a material that allows light beams with the vertical polarization direction to pass through and blocks light beams with the horizontal polarization direction, and the fourth pattern 124B2 may be a material that allows light beams with the horizontal polarization direction to pass through and blocks light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The third pattern 124B1 may be a material that allows the first light beam with the first wavelength to pass through and blocks the second light beam with the second wavelength, such as a red light filter or a green light filter. The fourth pattern 124B2 may be a material that allows the second light beam with the second wavelength to pass through and blocks the first light beam with the first wavelength, such as a blue light filter.

In some embodiments, the third pattern 124B1 may absorb the second light beam L2 or reflect the second light beam L2, and the fourth pattern 124B2 may absorb the first light beam L1 or reflect the first light beam L1. Therefore, when the first light beam L1 illuminates the second light gate 124B, the first light beam L1 penetrates through the third pattern 124B1, and the first light beam L1 does not penetrate through the fourth pattern 124B2. When the second light beam L2 illuminates the second light gate 124B, the second light beam L2 does not penetrate through the third pattern 124B1, and the second light beam L2 penetrates through the fourth pattern 124B2.

Therefore, when the first light beam L1 and the second light beam L2 are incident to the light gate device 120B, the first light beam L1 may be patterned by the first light gate 122B and the second light gate 124B, and the second light beam L2 may be patterned by the second light gate 124B. Specifically, the first light beam L1 may be patterned by the first pattern 122B1 of the first light gate 122B and the third pattern 124B1 of the second light gate 124B, and the second light beam L2 may be patterned by the fourth pattern 124B2 of the second light gate 124B. The first light beam L1 is patterned by two light gates, and the second light beam L2 is patterned by one light gate.

In some embodiments, the first light gate 122B and the second light gate 124B have different patterns. For example, the first pattern 122B1 of the first light gate 122B and the third pattern 124B1 of the second light gate 124B have different patterns, and the second pattern 122B2 of the first light gate 122B and the fourth pattern 124B2 of the second light gate 124B have different patterns.

In some embodiments, the first light gate 122B and the second light gate 124B have the same pattern. For example, the first pattern 122B1 of the first light gate 122B and the third pattern 124B1 of the second light gate 124B have the same pattern, and the second pattern 122B2 of the first light gate 122B and the fourth pattern 124B2 of the second light gate 124B have the same pattern.

Figure 8B:
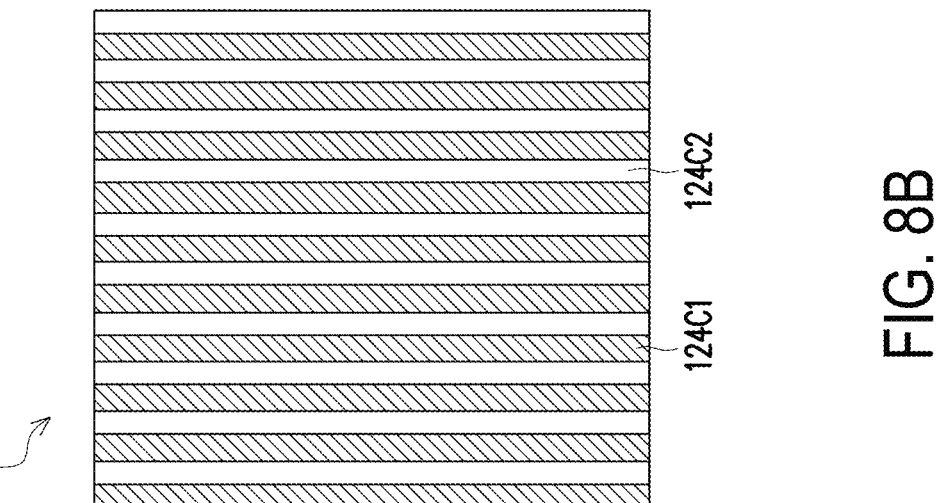
FIG. 8A and FIG. 8B respectively are schematic diagrams of a first light gate and a second light gate according to an embodiment of the disclosure.
Figure 8A:
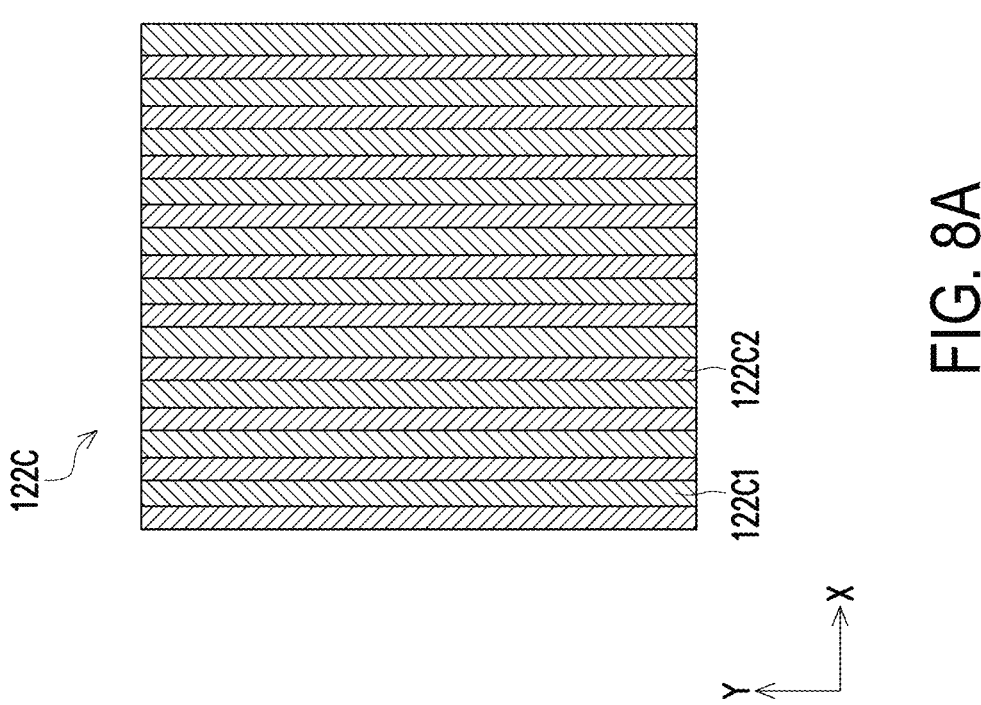

FIG. 8A and FIG. 8B respectively are schematic diagrams of another first light gate and another second light gate according to an embodiment of the disclosure. A first light gate 122C is an embodiment of the first light gate 122 in FIG. 2. A second light gate 124C is an embodiment of the second light gate 124 in FIG. 2.

Referring to FIG. 2, FIG. 8A and FIG. 8B together, when the first light beam L1 and the second light beam L2 are incident to the light gate device 120, the first light beam L1 sequentially passes through the first light gate 122C and the second light gate 124C, and the second light beam L2 sequentially passes through the first light gate 122C and the second light gate 124C.

A part of the first light beam L1 passes through the first light gate 122C, and the part of the first light beam L1 (i.e., the part that passes through the first light gate 122C) completely passes through the second light gate 124. A part of the second light beam L2 passes through the first light gate 122C, and the part of the second light beam L2 (i.e., the part that passes through the first light gate 122C) partially passes through the second light gate 124C. In other words, compared to FIG. 6A and FIG. 6B, in FIG. 8A, the second light beam L2 only partially passes through the first light gate 122C.

Specifically, when the first light beam L1 passes through the first light gate 122C, the first light gate 122C patterns the first light beam L1, i.e., a part of the first light beam L1 passes through the first light gate 122C, and a part of the first light beam L1 is blocked by the first light gate 122C. When the first light beam L1 passing through the first light gate 122C is incident to the second light gate 124C, the second light gate 124C is transparent relative to the first light beam L1, and the first light beam L1 may completely pass through the second light gate 124C, so that the patterning of the first light beam L1 by the first light gate 122C is retained.

On the other hand, when the second light beam L2 passes through the first light gate 122C, the first light gate 122C patterns the second light beam L2, i.e., a part of the second light beam L2 passes through the first light gate 122C, and a part of the second light beam L2 is blocked by the first light gate 122C. When the second light beam L2 passing through the first light gate 122C is incident to the second light gate 124C, a part of the second light beam L2 passing through the first light gate 122C is blocked by the second light gate 124C, so that the second light beam L2 is patterned again by the second light gate 124C.

Specifically, as shown in FIG. 8A, the first light gate 122C includes a first pattern 122C1 and a second pattern 122C2. The first pattern 122C1 includes a plurality of rectangles, and the second pattern 122C2 includes a plurality of rectangles. The plurality of rectangles of the first pattern 122C1 and the plurality of rectangles of the second pattern 122C2 are arranged in an alternating manner. In some embodiments, the rectangle of the first pattern 122C1 has the same size as the rectangle of the second pattern 122C2. In some embodiments, the rectangle of the first pattern 122C1 and the rectangle of the second pattern 122C2 are different in size.

In the embodiment, the first pattern 122C1 is made of a material that allows the first light beam L1 to pass through and blocks the second light beam L2. The second pattern 122C2 is made of a material that blocks the first light beam L1 and allows the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The first pattern 122C1 may be a material that allows light beams with the vertical polarization direction to pass through and blocks light beams with the horizontal polarization direction, and may not have any material, and the second pattern 122C2 may be a material that allows light beams with the horizontal polarization direction to pass through and blocks light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The first pattern 122C1 may be a material that allows the first light beam with the first wavelength to pass through and blocks the second light beam with the second wavelength, such as a green light filter, and the second pattern 122C2 may be a material that allows the second light beam with the second wavelength to pass through and blocks the first light beam with the first wavelength, such as a blue light filter.

In some embodiments, the first pattern 122C1 may absorb the second light beam L2 or reflect the second light beam L2, and the second pattern 122C2 may absorb the first light beam L1 or reflect the first light beam L1. Therefore, when the first light beam L1 illuminates the first light gate 122C, the first light beam L1 penetrates through the first pattern 122C1, but the first light beam L1 does not penetrate through the second pattern 122C2. When the second light beam L2 illuminates the first light gate 122C, the second light beam L2 does not penetrate through the first pattern 122C1, but the second light beam L2 penetrates through the second pattern 122C2.

As shown in FIG. 8B, the second light gate 124C includes a third pattern 124C1 and a fourth pattern 124C2. The third pattern 124C1 includes a plurality of rectangles, and the fourth pattern 124C2 includes a plurality of rectangles. The plurality of rectangles of the third pattern 124C1 and the plurality of rectangles of the fourth pattern 124C2 are arranged in an alternating manner. In some embodiments, the rectangle of the third pattern 124C1 has the same size as the rectangle of the fourth pattern 124C2. In some embodiments, the rectangle of the third pattern 124C1 and the rectangle of the fourth pattern 124C2 are different in size.

In the embodiment, the third pattern 124C1 is made of a material that allows the first light beam L1 to pass through and blocks the second light beam L2. The fourth pattern 124C2 is made of a material that allows the first light beam L1 and the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The third pattern 124C1 may be a material that allows light beams with the vertical polarization direction to pass through and blocks light beams with the horizontal polarization direction, while the fourth pattern 124C2 may not have any material. In some embodiments, the first light beam L1 has a first wavelength, and the second light beam L2 has a second wavelength that is different from the first wavelength. For example, the first light beam L1 is blue light, and the second light beam L2 is red light or green light. The third pattern 124C1 may be a material that allows the first light beam with the first wavelength to pass through and block the second light beam with the second wavelength, such as a red light filter or a green light filter. The fourth pattern 124C2 may not have any material.

In some embodiments, the third pattern 124C1 may absorb the second light beam L2 or reflect the second light beam L2. Therefore, when the first light beam L1 illuminates the second light gate 124C, the first light beam L1 penetrates through the third pattern 124C1 and the fourth pattern 124C2. When the second light beam L2 illuminates the second light gate 124C, the second light beam L2 does not penetrate through the third pattern 124C1, but the second light beam L2 penetrates through the fourth pattern 124C2.

Therefore, when the first light beam L1 and the second light beam L2 are incident to the light gate device 120, the first light beam L1 may be patterned by the first light gate 122C, and the second light beam L2 may be patterned by the first light gate 122C and the second light gate 124C. Specifically, the first light beam L1 may be patterned by the first pattern 122C1 of the first light gate 122C, and the second light beam L2 may be patterned by the second pattern 122C2 of the first light gate 122C and the fourth pattern 124C2 of the second light gate 124C. The first light beam L1 is patterned by one light gate, and the second light beam L2 is patterned by two light gates.

In some embodiments, the first light gate 122C and the second light gate 124C have different patterns. For example, the first pattern 122C1 of the first light gate 122C and the third pattern 124C1 of the second light gate 124C have different patterns, and the second pattern 122C2 of the first light gate 122C and the fourth pattern 124C2 of the second light gate 124C have different patterns.

In some embodiments, the first light gate 122C and the second light gate 124C have the same pattern. For example, the first pattern 122C1 of the first light gate 122C and the third pattern 124C1 of the second light gate 124C have the same pattern, and the second pattern 122C2 of the first light gate 122C and the fourth pattern 124C2 of the second light gate 124C have the same pattern.

Figure 9B:
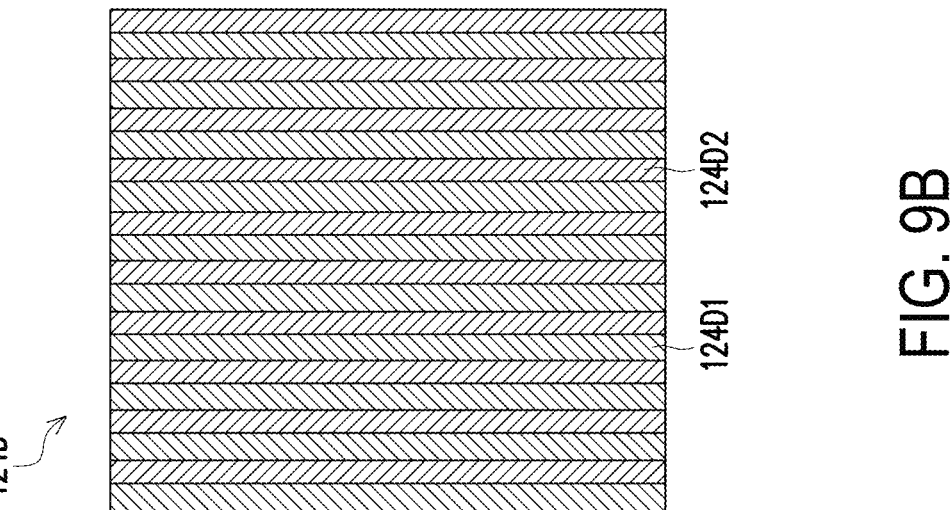
FIG. 9A and FIG. 9B respectively are schematic diagrams of a first light gate and a second light gate according to an embodiment of the disclosure.
Figure 9A:
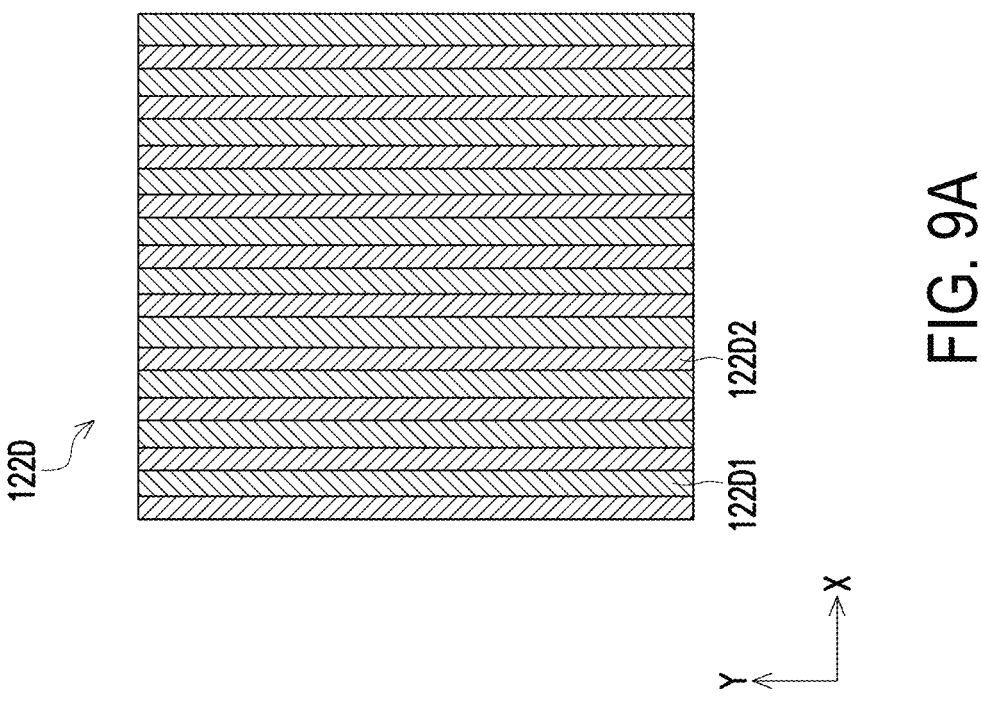

FIG. 9A and FIG. 9B are schematic diagrams of another type of first light gate and second light gate according to an embodiment of the disclosure. A first light gate 122D is an embodiment of the first light gate 122 in FIG. 2. A second light gate 124D is an embodiment of the second light gate 124 in FIG. 2.

Referring to FIG. 2, FIG. 9A and FIG. 9B together, when the first light beam L1 and the second light beam L2 are incident to the light gate device 120, the first light beam L1 sequentially passes through the first light gate 122D and the second light gate 124D, and the second light beam L2 sequentially passes through the first light gate 122D and the second light gate 124D.

A part of the first light beam L1 passes through the first light gate 122D, and the part of the first light beam L1 (i.e., the part that passes through the first light gate 122D) partially passes through the second light gate 124D. A part of the second light beam L2 passes through the first light gate 122D, and the part of the second light beam L2 (i.e., the part that passes through the first light gate 122D) partially passes through the second light gate 124D. In other words, relative to FIG. 6A and FIG. 6B, in FIG. 9A, the first light beam L1 only partially passes through the first light gate 122D and the second light gate 124D, and the second light beam L2 only partially passes through the first light gate 122D and the second light gate 122D.

Specifically, when the first light beam L1 passes through the first light gate 122D, the first light gate 122D patterns the first light beam L1, i.e., a part of the first light beam L1 passes through the first light gate 122D, and a part of the first light beam L1 is blocked by the first light gate 122D. When the first light beam L1 passing through the first light gate 122D is incident to the second light gate 124D, a part of the first light beam L1 passing through the first light gate 122D is blocked by the second light gate 124D, so that the first light beam L1 is patterned again by the second light gate 124D.

On the other hand, when the second light beam L2 passes through the first light gate 122D, the first light gate 122D patterns the second light beam L2, i.e., a part of the second light beam L2 passes through the first light gate 122D, and a part of the second light beam L2 is blocked by the first light gate 122D. When the second light beam L2 passing through the first light gate 122D is incident to the second light gate 124D, a part of the second light beam L2 passing through the first light gate 122D is blocked by the second light gate 124D, so that the second light beam L2 is patterned again by the second light gate 124D.

Specifically, as shown in FIG. 9A, the first light gate 122D includes a first pattern 122D1 and a second pattern 122D2. The first pattern 122D1 includes a plurality of rectangles, and the second pattern 122D2 includes a plurality of rectangles. The plurality of rectangles of the first pattern 122D1 and the plurality of rectangles of the second pattern 122D2 are arranged in an alternating manner. In some embodiments, the rectangle of the first pattern 122D1 has the same size as the rectangle of the second pattern 122D2. In some embodiments, the rectangle of the first pattern 122D1 and the rectangle of the second pattern 122D2 are different in size.

In the embodiment, the first pattern 122D1 is made of a material that allows the first light beam L1 to pass through and blocks the second light beam L2. The second pattern 122D2 is made of a material that blocks the first light beam L1 and allows the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The first pattern 122D1 may be a material that allows light beams with the vertical polarization direction to pass through and blocks light beams with the horizontal polarization direction, and may not have any material, and the second pattern 122D2 may be a material that allows light beams with the horizontal polarization direction to pass through and blocks light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The first pattern 122D1 may be a material that allows the first light beam with the first wavelength to pass through and blocks the second light beam with the second wavelength, such as a red light filter or a green light filter, and the second pattern 122D2 may be a material that allows the second light beam with the second wavelength to pass through and blocks the first light beam with the first wavelength, such as a blue light filter.

In some embodiments, the first pattern 122D1 may absorb the second light beam L2 or reflect the second light beam L2, and the second pattern 122D2 may absorb the first light beam L1 or reflect the first light beam L1. Therefore, when the first light beam L1 illuminates the first light gate 122D, the first light beam L1 penetrates through the first pattern 122D1, but the first light beam L1 does not penetrate through the second pattern 122D2. When the second light beam L2 illuminates the first light gate 122D, the second light beam L2 does not penetrate through the first pattern 122D1, but the second light beam L2 penetrates through the second pattern 122D2.

As shown in FIG. 9B, the second light gate 124D includes a third pattern 124D1 and a fourth pattern 124D2. The third pattern 124D1 includes a plurality of rectangles, and the fourth pattern 124D2 includes a plurality of rectangles. The plurality of rectangles of the third pattern 124D1 and the plurality of rectangles of the fourth pattern 124D2 are arranged in an alternating manner. In some embodiments, the rectangle of the third pattern 124D1 has the same size as the rectangle of the fourth pattern 124D2. In some embodiments, the rectangle of the third pattern 124D1 and the rectangle of the fourth pattern 124D2 are different in size.

In the embodiment, the third pattern 124D1 is made of a material that allows the first light beam L1 to pass through and blocks the second light beam L2. The fourth pattern 124D2 is made of a material that blocks the first light beam L1 and allows the second light beam L2 to pass through. In some embodiments, the first light beam L1 has a first polarization direction, and the second light beam L2 has a second polarization direction perpendicular to the first polarization direction. For example, the first light beam L1 is vertically polarized, and the second light beam L2 is horizontally polarized. The third pattern 124D1 may be a material that allows light beams with the vertical polarization direction to pass through and blocks light beams with the horizontal polarization direction, and the fourth pattern 124D2 may be a material that allows the light beams with the horizontal polarization direction to pass through and blocks the light beams with the vertical polarization direction. In some embodiments, the first light beam L1 has a first wavelength, and the second light beam L2 has a second wavelength that is different from the first wavelength. For example, the first light beam L1 is blue light, and the second light beam L2 is red light or green light. The third pattern 124D1 may be a material that allows the first light beam with the first wavelength to pass through and blocks the second light beam with the second wavelength, such as a red light filter or a green light filter. The fourth pattern 124D2 may be a material that allows the second light beam with the second wavelength to pass through and blocks the first light beam with the first wavelength, such as a blue light filter.

In some embodiments, the third pattern 124D1 may absorb the second light beam L2 or reflect the second light beam L2, and the fourth pattern 124D2 may absorb the first light beam L1 or reflect the first light beam L1. Therefore, when the first light beam L1 illuminates the second light gate 124D, the first light beam L1 penetrates through the third pattern 124D1, but the first light beam L1 does not penetrate through the fourth pattern 124D2. When the second light beam L2 illuminates the second light gate 124D, the second light beam L2 does not penetrate through the third pattern 124D1, but the second light beam L2 penetrates through the fourth pattern 124D2.

Therefore, when the first light beam L1 and the second light beam L2 are incident to the light gate device 120D, the first light beam L1 may be patterned by the first light gate 122D and the second light gate 124D, and the second light beam L2 may be patterned by the first light gate 122D and second light gate 124D are patterned. Specifically, the first light beam L1 may be patterned by the first pattern 122D1 of the first light gate 122D and the third pattern 124D1 of the second light gate 124D, and the second light beam L2 may be patterned by the second pattern 122D2 of the first light gate 122D and the fourth pattern 124D2 of the second light gate 124D. The first light beam L1 is patterned by two light gates, and the second light beam L2 is patterned by two light gates.

In some embodiments, the first light gate 122D and the second light gate 124D have different patterns. For example, the first pattern 122D1 of the first light gate 122D and the third pattern 124D1 of the second light gate 124D have different patterns, and the second pattern 122D2 of the first light gate 122D and the fourth pattern 124D2 of the second light gate 124D have different patterns.

In some embodiments, the first light gate 122D and the second light gate 124D have the same pattern. For example, the first pattern 122D1 of the first light gate 122D and the third pattern 124D1 of the second light gate 124D have the same pattern, and the second pattern 122D2 of the first light gate 122D and the fourth pattern 124D2 of the second light gate 124D have the same pattern.

Therefore, according to different combinations of the first light gate and the second light gate, such as FIG. 6A and FIG. 6B, FIG. 7A and FIG. 7B, FIG. 8A and FIG. 8B, or FIG. 9A and FIG. 9B, the light gate device 120 may pattern the first light beam and the second light beam, and produce the first image and the second image with different depths of field.

Referring to FIG. 2 again, after the first light beam L1 passes through the light gate device 120, through the first light gate 122 and the second light gate 124, the first light beam L1 forms a patterned first light beam L1. After the second light beam L2 passes through the light gate device 120, through the first light gate 122 and the second light gate 124, the second light beam L2 forms a patterned second light beam L2. The first light beam L1 and the second light beam L2 are incident on the projection lens group 130.

As shown in FIG. 2, the projection device 100 further includes a projection lens group 130. The projection lens group 130 is located on the optical paths of the first light beam L1 and the second light beam L2 and is located downstream of the light gate device 120. In some embodiments, the projection lens group 130 is a combination of one or more optical lenses 132 having diopters. The optical lenses 132 include, for example, various combinations of non-planar lenses such as a biconcave lens, a biconvex lens, a concavo-convex lens, a convexo-concave lens, a plano-convex lens, a plano-concave lens, etc. The disclosure does not limit the pattern and type of the projection lens group 130. In some embodiments, the projection device 100 may not include the projection lens group 130, which is not limited by the disclosure.

Referring to FIG. 2 again, after the first light beam L1 and the second light beam L2 patterned by the light gate device 120 pass through the projection lens group 130, the first light beam L1 produces first images I11, I12, and I13 in a first depth of field range D1. The second light beam L2 produces second images I21, I22, and I23 in a second depth of field range D2 that is different from the first depth of field range D1. The first images I11, I12, and I13 and the second images I21, I22, and I23 are projected on the object S to be measured (not shown).

Specifically, depth of field (DOF) is a distance between the nearest and farthest points that may be clearly focused when the focal length is aimed at a certain point, which is affected by a focal length of the lens, an aperture size and a distance of a photographed subject. In the embodiment, it is equivalent to the nearest (for example, the first image I11 of the first light beam L1, the second image I21 of the second light beam L2) and farthest points (for example, the first image I13 of the first light beam L1 and the second image I23 of the second light beam L2) that may be clearly focused when the focal length of the projection lens group 130 is aligned with the object S to be measured. Therefore, the first depth of field range D1 is a distance between the first image I11 and the first image I13, and the second depth of field range D2 is a distance between the second image I21 and the second image I23. Therefore, the depth of field range D of the entire lighting device may be expanded to the range between the first image I11 and the second image I23. Therefore, the depth of field range of the entire illuminating device may be increased under the same focal length of lens and aperture size.

Referring to FIG. 2 again, after the first images I11, I12, and I13 and the second images I21, I22, and I23 are projected on the object S to be measured, they are reflected by the object S to be measured to form corresponding image beams. The first images I11, I12 and I13 are reflected by the object S to form the first image beam IL1, and the second images I21, I22 and I23 are reflected by the object S to be measured to form the second image beam IL2. The first image beam IL1 and the second image beam IL2 are incident to the imaging device 200A.

The imaging device 200A shown in FIG. 2 is an embodiment of the imaging device 200 in FIG. 1. The imaging device 200A is configured to record the first images I11, I12, and I13 and the second images I21, I22, and I23. Specifically, after receiving the first image beam IL1 and the second image beam IL2, the imaging device 200A performs analysis and processing to record the first images I11, I12, and I13 and the second images I21, I22, and I23.

As shown in FIG. 2, the imaging device 200A includes a lens 210A, a first image sensor 230A1, and a second image sensor 230A2. After the first image beam IL1 and the second image beam IL2 are incident to the lens 210A, they are split by a light-splitting element 220A and then incident to the first image sensor 230A1 and the second image sensor 230A2 respectively.

The lens 210A is located on the optical paths of the first image beam IL1 and the second image beam IL2. In some embodiments, the lens 210A is a combination of one or more optical lenses 212A having diopters. The optical lenses 212A include, for example, various combinations of non-planar lenses such as a biconcave lens, a biconvex lens, a concavo-convex lens, a convexo-concave lens, a plano-convex lens, a plano-concave lens, etc. The disclosure does not limit the pattern and type of the lens 210A.

After the first image beam IL1 and the second image beam IL2 pass through the lens 210A, they are incident to the light-splitting element 220A, and through the light-splitting element 220, they are incident to the first image sensor 230A1 and the second image sensor 230A2 respectively.

According to some embodiments, the first image sensor 230A1 and the second image sensor 230A2 sense the first images I11, I12, and I13 and the second images I21, I22, and I23 at the same time. When the first image beam IL1 and the second image beam IL2 are split into two parts by the light-splitting element 220A, a part of a first image beam IL1' and a part of a second image beam IL2' are incident to the first image sensor 230A1. Another part of a first image beam IL1" and another part of a second image beam IL2" are incident to the second image sensor 230A2. Therefore, there is a light filter 240A1 between the light-splitting element 220A and the first image sensor 230A1 for removing the second image beam IL2, so that the first image beam IL1 is incident to the first image sensor 230A1. There is a light filter 240A2 between the spectroscopic element 220A and the second image sensor 230A2 for removing the first image beam IL1, so that the second image beam IL2 is incident to the second image sensor 230A2.

Subsequently, the first image sensor 230A1 converts the received first image beam IL1 into the first images I11, I12, and I13 through the processor 300, and the second image sensor 230A2 converts the received second image beam IL2 into the second images I21, I22, and I23 through the processor 300.

In some embodiments, the first image sensor 230A1 and the second image sensor 230A2 may be, for example, optoelectronic elements that may convert optical signals into electrical signals, such as complementary metal-oxide-semiconductors. (CMOS), charge-coupled devices (CCD), photomultiplier tubes (PMT) or avalanche photodiodes (APD), and preferably CMOS, CCD, but the disclosure is not limited thereto.

Therefore, through the imaging device 200A, the first image sensor 230A1 and the second image sensor 230A2 may be used to simultaneously sense the first images I11, I12, and I13 and the second images I21, I22, and I23, so as to increase the ability to collect data.

In other embodiments, the first image sensor 230A1 and the second image sensor 230A2 may also respectively sense the first images I11, I12, and I13 and the second images I21, I22, and I23 in different time periods. Specifically, the first image sensor 230A1 senses the first images I11, I12, and I13 in a first time period, and the second image sensor 230A2 senses the second images I21, I21, and I23 in a second time period that is different from the first time period. When the first image sensor 230A1 and the second image sensor 230A2 respectively sense the first images I11, I12, and I13 and the second images I21, I22, and I23 in different time periods, especially when the light-emitting device 110 is controlled to emit the first light beam L1 in the first time period to generate the first images I11, I12, and I13, and emit the second light beam L2 in the second time period to generate the second images I21, I22, and I23, so that the first image sensor 230A1 and the second image sensor 230A2 may respectively sense cleaner first images I11, I12, and I13 and second images I21, I22, and I23, so as to increase a resolution of the images.

Figure 10:
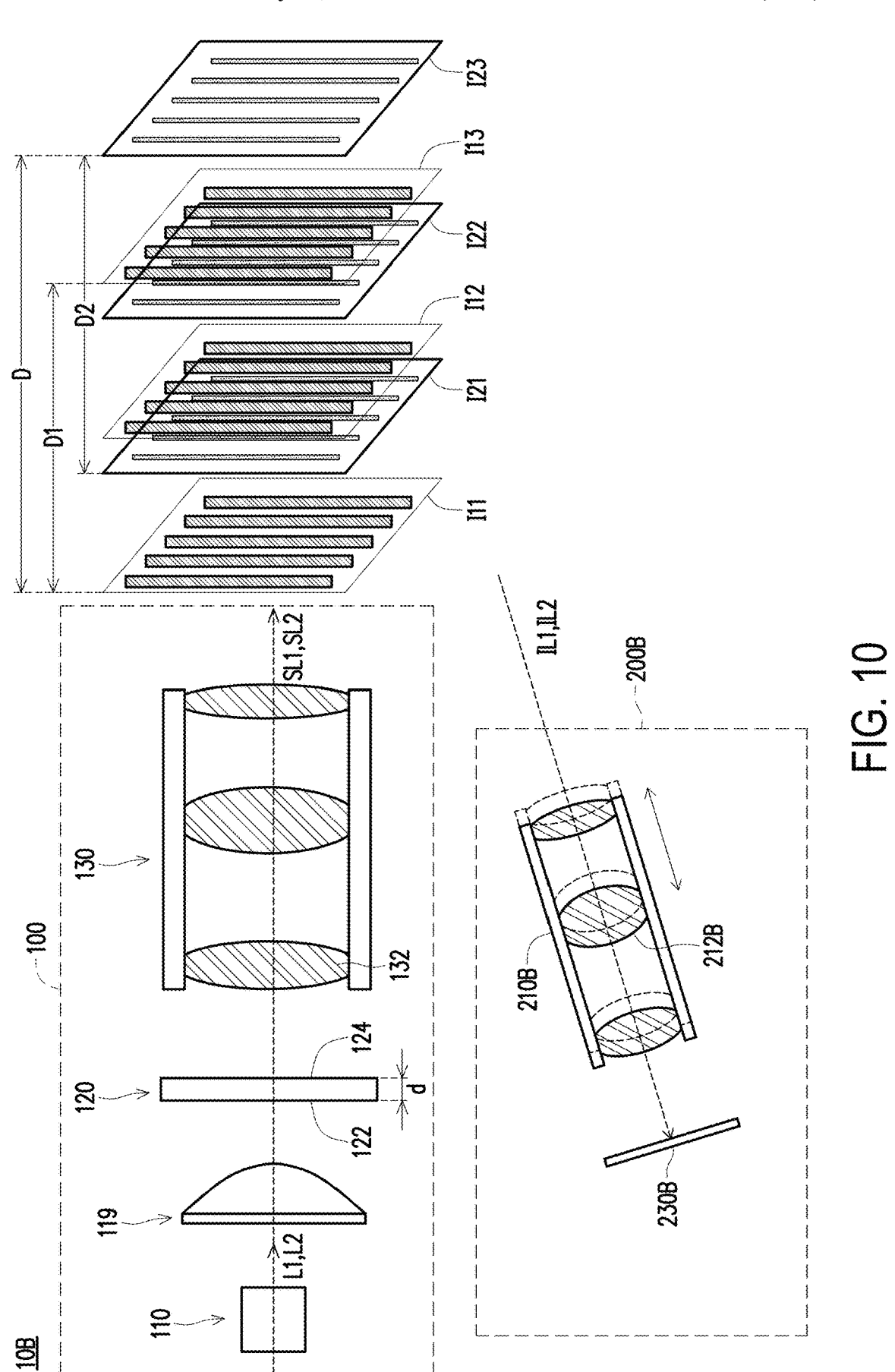
FIG. 10 is a schematic diagram of an illuminating device according to an embodiment of the disclosure.

FIG. 10 is a schematic diagram of an illuminating device according to an embodiment of the disclosure. Referring to FIG. 10, an illuminating device 10B shown in FIG. 10 is an embodiment of the illuminating device 10 in FIG. 1. The illuminating device 10B shown in FIG. 10 is similar to the illuminating device 10A shown in FIG. 2, so description of similarities therebetween is not repeated herein. The difference between FIG. 10 and FIG. 2 is that the imaging device 200A in FIG. 2 is replaced with an imaging device 200B.

The imaging device 200B in FIG. 10 is an embodiment of the imaging device 200 in FIG. 1. As shown in FIG. 10, the imaging device 200B includes a lens 210B and an image sensor 230B.

In the embodiment, the lens 210B has a plurality of optical lenses 212B. The lens 210B is similar to the lens 210A of FIG. 2, so description of similarities therebetween is not repeated herein. The difference between the lens 210B and the lens 210A is that the lens 210B is a movable lens. The lens 210B moves back and forth along the optical paths of the first image beam IL1 and the second image beam IL2 to change projection positions of the first images I11, I12, and I13 and the second images I21, I22, and I23 on the image sensor 230B of the imaging device 200B.

On the other hand, the imaging device 200B only has one image sensor 230B. After the first image beam IL1 and the second image beam IL2 pass through the lens 210B, they are incident to the image sensor 230B. Therefore, the image sensor 230B may receive the first image beam IL1 and the second image beam IL2 at the same time, and sense the first images I11, I12, and I13 and the second images I21, I22, and I23 at the same time.

In the embodiment, the type of the image sensor 230B is similar to that of the first image sensor 230A1 and the second image sensor 230A2 shown in FIG. 2, so detailed description thereof is not repeated herein.

In other embodiments, the image sensor 230B may also be replaced by the light-splitting element 220A, and the first image sensor 230A1 and the second image sensor 230A2 shown in FIG. 2, which is not limited by the disclosure.

Through the imaging device 200B as shown in FIG. 10, the imaging device 200B may change projection positions of the first image beam IL1 and the second image beam IL2 on the image sensor 230B by adjusting a position of the lens 210B, so that the image sensor 230B may improve the image quality of the first images I11, I12, and I13 and the second images I21, I22, and I23.

Figure 11:
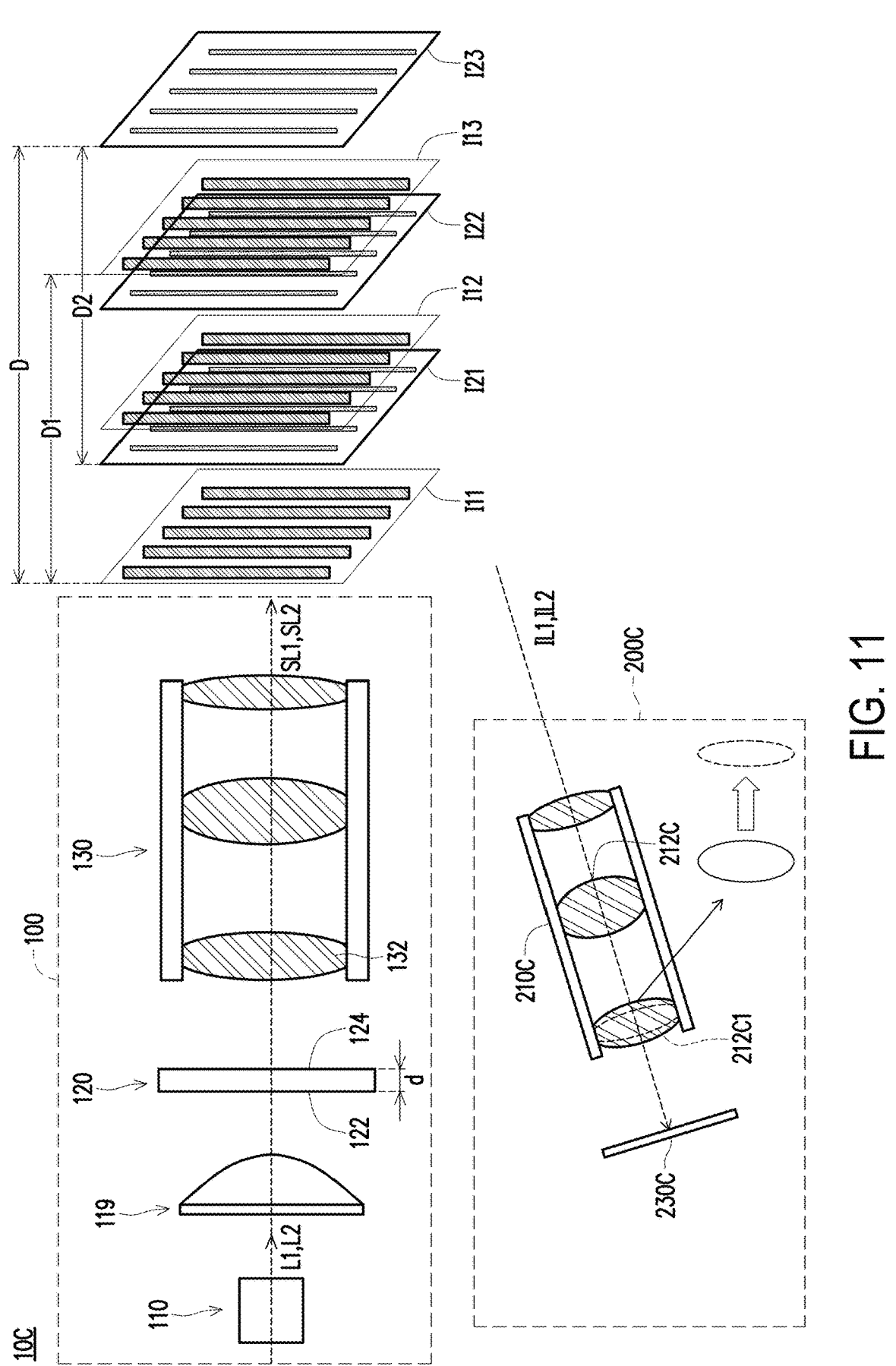
FIG. 11 is a schematic diagram of an illuminating device according to an embodiment of the disclosure.

FIG. 11 is a schematic diagram of an illuminating device according to an embodiment of the disclosure. Referring to FIG. 11. An illuminating device 10C shown in FIG. 11 is an embodiment of the illuminating device 10 in FIG. 1. The illuminating device 10C shown in FIG. 11 is similar to the illuminating device 10A shown in FIG. 2, so description of similarities therebetween is not repeated herein. The difference between FIG. 11 and FIG. 2 is that the imaging device 200A in FIG. 2 is replaced by an imaging device 200C.

The imaging device 200C in FIG. 11 is an embodiment of the imaging device 200 in FIG. 1. As shown in FIG. 11, the imaging device 200C includes a lens 210C and an image sensor 230C.

In the embodiment, the lens 210C has a plurality of optical lenses 212C. The lens 210C is similar to the lens 210A of FIG. 2, so description of similarities therebetween is not repeated herein. The difference between the lens 210C and the lens 210A is that the lens 210C includes a zoom lens 212C1, which is used to change a focal length of the lens 210C and change projection positions of the first images I11, I12, and I13 and the second images I21, I22, and I23 on the image sensor 230C of imaging device 200C.

In some embodiments, the zoom lens 212C1 is located at A position closest to the image sensor 230C in the optical lens 212 of the lens 210C. The zoom lens 212C1 may also be located at other suitable positions in the lens 210C, which is not limited by the disclosure.

In some embodiments, the zoom lens 212C1 may be an electromagnetic driven zoom lens, a fluid pressure driven zoom lens, an electrodeformation driven zoom lens, or the like, which is not limited by the disclosure.

On the other hand, in the embodiment, the type of the image sensor 230C is similar to that of the image sensor 230B, so detailed description thereof is not repeated herein.

In other embodiments, the image sensor 230C may also be replaced by the light-splitting element 220A, and the first image sensor 230A1 and the second image sensor 230A2 shown in FIG. 2, which is not limited by the disclosure.

Through the imaging device 200C as shown in FIG. 11, the imaging device 200C may adjust a focal length of the lens 210C through the zoom lens 212C1 to change the projection positions of the first image beam IL1 and the second image beam IL2 on the image sensor 230C, such that the image sensor 230C may improve the image quality of the first images I11, I12, and I13 and the second images I21, I22, and I23.

Figure 12:
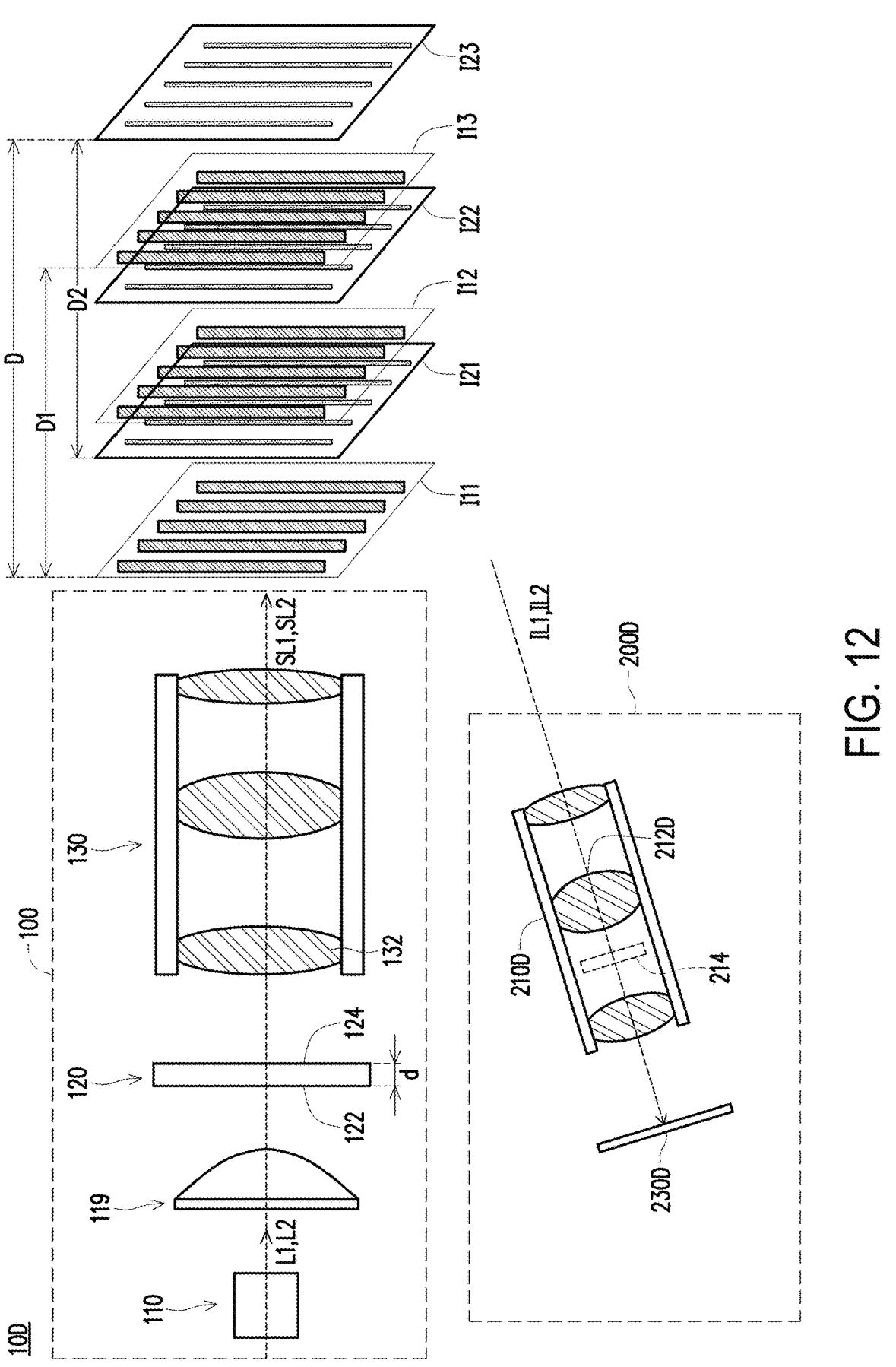
FIG. 12 is a schematic diagram of an illuminating device according to an embodiment of the disclosure.

FIG. 12 is a schematic diagram of an illuminating device according to an embodiment of the disclosure. Referring to FIG. 12, an illuminating device 10D shown in FIG. 12 is an embodiment of the illuminating device 10 in FIG. 1. The illuminating device 10D shown in FIG. 12 is similar to the illuminating device 10A shown in FIG. 2, so description of similarities therebetween is not repeated herein. The difference between FIG. 12 and FIG. 2 is that the imaging device 200A in FIG. 2 is replaced by an imaging device 200D.

The imaging device 200D in FIG. 12 is an embodiment of the imaging device 200 in FIG. 1. As shown in FIG. 12, the imaging device 200C includes a lens 210D and an image sensor 230D.

In the embodiment, the lens 210D has a plurality of optical lenses 212D. The lens 210D is similar to the lens 210A of FIG. 2, so description of similarities therebetween is not repeated herein. The difference between the lens 210D and the lens 210A is that the lens 210D includes a movable lens 214 that moves in the lens 210D along the optical paths of the first image beam IL1 and the second image beam IL2 to change a focal length of the lens 210D and change projection positions of the first images I11, I12, and I13 and the second images I21, I22, and I23 on the image sensor 230D of the imaging device 200D.

In some embodiments, the movable lens 214 may be located at any position of the lens 210D, but the disclosure is not limited thereto.

In some embodiments, the movable lens 214 may be any non-planar lens including, for example, a biconcave lens, a biconvex lens, a concavo-convex lens, a convexo-concave lens, a plano-convex lens, a plano-concave lens, etc., and the pattern and type of the movable lens 214 is not limited by the disclosure.

On the other hand, in the embodiment, the type of the image sensor 230D is similar to that of the image sensor 230B, so detailed description thereof is not repeated herein.

In other embodiments, the image sensor 230D may also be replaced by the light-splitting element 220A, and the first image sensor 230A1 and the second image sensor 230A2 shown in FIG. 2, which is not limited by the disclosure.

Through the imaging device 200D as shown in FIG. 12, the imaging device 200D may adjust a focal length of the lens 210D by changing a position of the movable lens 214 on the lens 210D to change projection positions of the first image beam IL1 and the second image beam IL2 on the image sensor 230D, so that the image sensor 230D may improve the image quality of the first images I11, I12, and I13 and the second images I21, I22, and I23.

In summary, the disclosure may simultaneously generate two images with different depths of field by controlling the shapes of the first light gate and the second light gate. Therefore, the depth of field of the system may be improved while maintaining brightness.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An illuminating device, comprising:
a projection device, comprising:
   a light-emitting device, configured to generate a first light beam to illuminate an object to be measured and generate a second light beam that is different from the first light beam to illuminate the object to be measured; and
   a light gate device, located in optical paths of the first light beam and the second light beam, wherein the light gate device comprises:
      a first light gate, located on a light incident surface of the light gate device; and
      a second light gate, located on a light exit surface of the light gate device,
   wherein the first light beam passes through the light gate device and produces a first image in a first depth of field range, and the second light beam passes through the light gate device and produces a second image in a second depth of field range that is different from the first depth of field range, and the first image and the second image are projected on the object to be measured; and
an imaging device, configured to record the first image and the second image.

2. The illuminating device according to claim 1, wherein the first light beam has a first wavelength and the second light beam has a second wavelength that is different from the first wavelength.

3. The illuminating device according to claim 1, wherein the first light beam has a first polarization direction, and the second light beam has a second polarization direction that is substantially perpendicular to the first polarization direction.

4. The illuminating device according to claim 1, wherein the light incident surface and the light exit surface of the light gate device are parallel to each other.

5. The illuminating device according to claim 1, wherein a part of the first light beam passes through the first light gate, and the part of the first light beam completely passes through the second light gate.

6. The illuminating device according to claim 1, wherein the second light beam completely passes through the first light gate, and the second light beam partially passes through the second light gate.

7. The illuminating device according to claim 1, wherein the first light gate comprises a first pattern and a second pattern,
   wherein when the first light beam illuminates the first light gate, the first light beam penetrates through the first pattern, and the first light beam does not penetrate through the second pattern,
   wherein when the second light beam illuminates the first light gate, the second light beam penetrates through the first pattern and the second pattern.

8. The illuminating device according to claim 1, wherein the first light gate comprises a first pattern and a second pattern,
   wherein when the first light beam illuminates the first light gate, the first light beam penetrates through the first pattern, and the first light beam does not penetrate through the second pattern, wherein when the second light beam illuminates the first light gate, the second light beam does not penetrate through the first pattern, and the second light beam penetrates through the second pattern.

9. The illuminating device according to claim 1, wherein the second light gate comprises a third pattern and a fourth pattern,
   wherein when the first light beam illuminates the second light gate, the first light beam penetrates through the third pattern and the fourth pattern,
   wherein when the second light beam illuminates the second light gate, the second light beam does not penetrate through the third pattern, and the second light beam penetrates through the fourth pattern.

10. The illuminating device according to claim 1, wherein the second light gate comprises a third pattern and a fourth pattern,
   wherein when the first light beam illuminates the second light gate, the first light beam penetrates through the third pattern, and the first light beam does not penetrate through the fourth pattern,
   wherein when the second light beam illuminates the second light gate, the second light beam does not penetrate through the third pattern, and the second light beam penetrates through the fourth pattern.

11. The illuminating device according to claim 1, wherein the first light gate and the second light gate have different patterns.

12. The illuminating device according to claim 1, wherein the first light gate and the second light gate have a same pattern.

13. The illuminating device according to claim 1, wherein the first light beam is one of infrared light, red light, green light, blue light, near-ultraviolet light, and ultraviolet light, and the second light beam is one of infrared light, red light, green light, blue light, near-ultraviolet light, and ultraviolet light.

14. The illuminating device according to claim 1, wherein the imaging device comprises a first image sensor and a second image sensor, the first image sensor is configured to sense the first image, and the second image sensor is configured to sense the second image.

15. The illuminating device according to claim 14, wherein the first image sensor and the second image sensor simultaneously sense the first image and the second image.

16. The illuminating device according to claim 14, wherein the first image sensor senses the first image in a first time period, and the second image sensor senses the second image in a second time period different from the first time period.

17. The illuminating device according to claim 1, wherein the imaging device comprises an image sensor, and the image sensor senses the first image in a first time period and senses a second image in a second time period that is different from the first time period.

18. The illuminating device according to claim 1, wherein the imaging device comprises a lens, the lens is a movable lens, and the movable lens moves back and forth along the optical paths to change projection positions of the first image and the second image on the imaging device.

19. The illuminating device according to claim 1, wherein the imaging device comprises a lens, and the lens comprises a zoom lens for changing projection positions of the first image and the second image on the imaging device.

20. The illuminating device according to claim 1, wherein the imaging device comprises a lens, and the lens comprises a movable lens that moves in the lens along the optical paths
to change a focal length of the lens.

* * * * *